United States Patent
Todorov et al.

(10) Patent No.: US 12,046,246 B2
(45) Date of Patent: Jul. 23, 2024

(54) SYSTEMS AND METHODS FOR AN IMMERSIVE AUDIO EXPERIENCE

(71) Applicant: Vibes & Logic, Inc., Marina del Rey, CA (US)

(72) Inventors: Ivan Todorov, Los Angeles, CA (US); Matt Zeiger, Leander, TX (US); Grant Skinner, Edmonton (CA)

(73) Assignee: VIBES & LOGIC, INC., Marina Del Rey, CA (US)

( * ) Notice: Subject to any disclaimer, the term of this patent is extended or adjusted under 35 U.S.C. 154(b) by 184 days.

(21) Appl. No.: 17/728,701

(22) Filed: Apr. 25, 2022

(65) Prior Publication Data

US 2022/0343923 A1 Oct. 27, 2022

Related U.S. Application Data

(60) Provisional application No. 63/178,983, filed on Apr. 23, 2021.

(51) Int. Cl.
*G10L 19/00* (2013.01)
(52) U.S. Cl.
CPC .................................. *G10L 19/00* (2013.01)

(58) Field of Classification Search
None
See application file for complete search history.

(56) References Cited

U.S. PATENT DOCUMENTS

| | | | |
|---|---|---|---|
| 10,820,131 B1 | 10/2020 | Oliva Elorza | |
| 2013/0261777 A1* | 10/2013 | Woodman | H04N 21/233 700/94 |
| 2020/0244715 A1 | 7/2020 | Lang | |
| 2021/0195716 A1* | 6/2021 | Rasmussen | G06F 16/4393 |

* cited by examiner

*Primary Examiner* — Hemant S Patel
(74) *Attorney, Agent, or Firm* — Loeb & Loeb LLP

(57) ABSTRACT

A computer-implemented method for creating an immersive audio experience. The method includes receiving a selection of an audio track via a user interface, and receiving audio track metadata for the audio track. The method includes querying an audio database based on the track metadata and determining that audio data for the audio track is not stored on the audio database. The method includes analyzing the audio track to determine one or more audio track characteristics. The method includes generating vibe data based on the one or more audio track characteristics, wherein the vibe data includes time-coded metadata. Based on the vibe data, generating visualization instructions for one or A/V devices in communication with a user computing device, and transmitting the generated visualization instructions and the audio track to the user computing device.

19 Claims, 9 Drawing Sheets

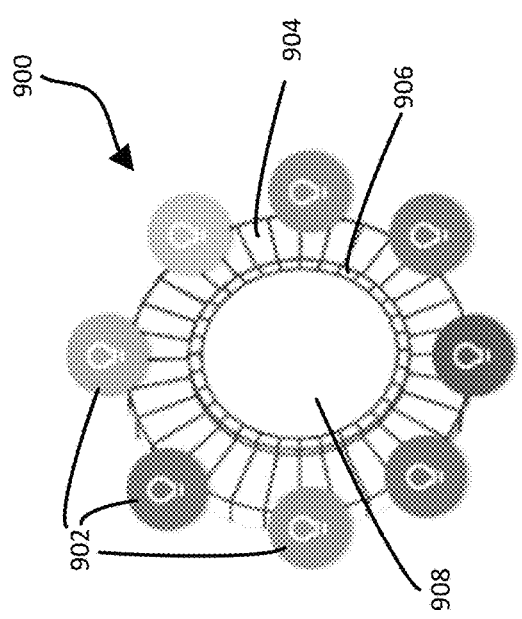
FIG. 9
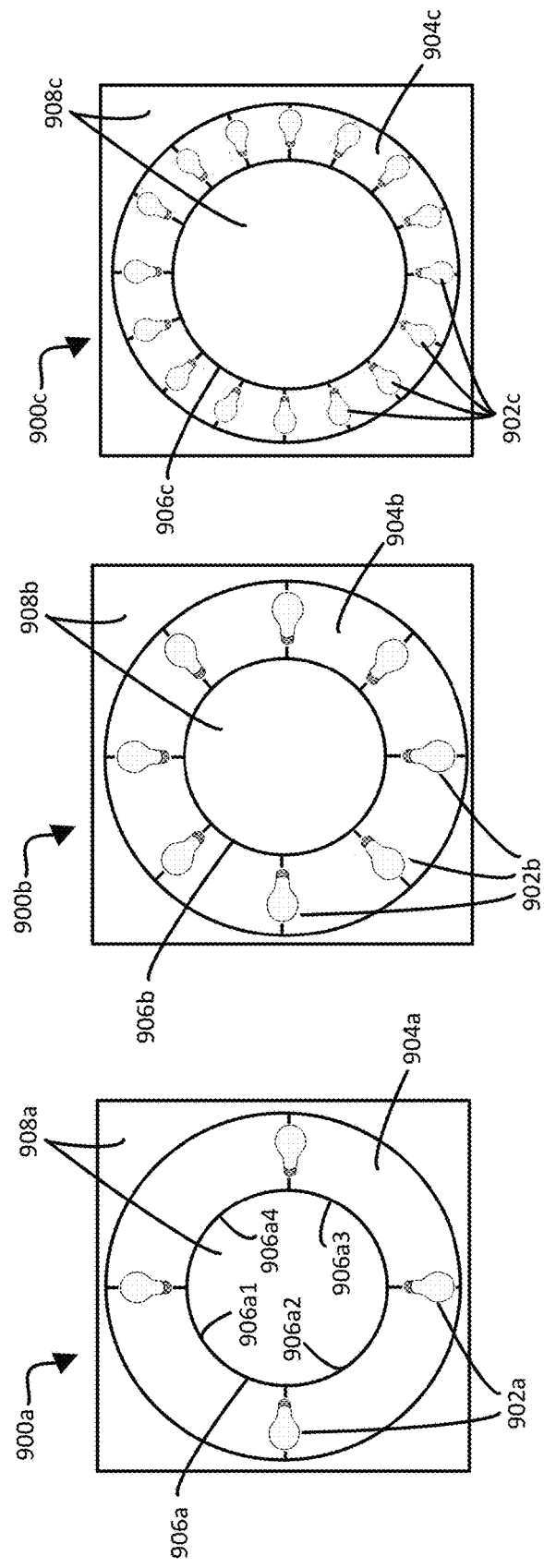
FIG. 10A
FIG. 10B
FIG. 10C

SYSTEMS AND METHODS FOR AN IMMERSIVE AUDIO EXPERIENCE

CROSS-REFERENCE TO RELATED APPLICATIONS

This application claims priority to U.S. Provisional Application No. 63/178,983, filed Apr. 23, 2021, the entirety of which is incorporated by reference herein.

BACKGROUND

The background description provided herein is for the purpose of generally presenting the context of the disclosure. The work of the presently named inventors, to the extent it is described in this background section, as well as aspects of the description that may not otherwise qualify as prior art at the time of filing, are neither expressly nor impliedly admitted as prior art against the present disclosure.

Traditionally, the experience of listening to music and audio at home may fall well-short of an in-person, live musical or other audio experience. Live music experiences may include many sensory inputs not traditionally available in the home, or at least not without enormous investment in equipment and large amounts of work on behalf of a user. For example, a concert or other live music experience may include audio, visual, and other sensory inputs that may not traditionally exist in the home setting or, even if they do, may not be easily configurable to provide an immersive musical and audio experience.

SUMMARY

The following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

In an embodiment, the disclosure describes a system for creating immersive music and audio experiences in a user's home, vehicle, or other location. The experience may create an environment for users to experience audio content, including music, podcasts, workouts, meditation, religious events, etc., in a sensory-immersive way that allows users to experience the music or other audio in a different way. This may include replicating, amplifying, or simulating a live music event, or may include non-live event artist motion graphics or features architected via artificial intelligence that may be different than a live event but nonetheless more immersive than standard audio experiences. In some embodiments, the system and methods may include artist or other content creator "experience packs" that may be inclusive of visual companions to their music, such as on-screen visualizers, light colors, motion patterns and stencils. The system may include various hardware components that may be installed in a user's home (e.g., L.E.D. lights, strobe lights, spot lights, lasers, speakers, projectors, etc.) and software running on a user's computing device (e.g., desktop/laptop, mobile phone, VR headset, tablet, etc.) that may be connected to a cloud network. In some embodiments, the result may be an immersive music or other audio experience that may include sound, lights, lasers, 3-D projections, VR/AR experiences, and other visual or sensory elements that emulate attending a concert, other live music events, or entirely AI generated experiences.

In some embodiments, the system and methods may transform harmonic intelligence from audio streams into stunning visual experiences using advanced technologies and smart devices. The process may use machine learning techniques to extract time-coded metadata used to predict and design the ultimate experience, or "vibe", to accompany and compliment the auditory content.

In some embodiments, the disclosure describes a computer-implemented method for creating an immersive audio experience. The method may include receiving, from a user computing device, a user selection of an audio track via a user interface, and receiving, from an audio source, audio track metadata for the audio track. The method may include querying an audio database based on the track metadata. Based on the query, the method may include determining that audio data for the audio track is not stored on the audio database. Based on the determination that audio data for the audio track is not stored on the audio database, the method may include analyzing the audio track to determine one or more audio track characteristics, and generating vibe data based on the one or more audio track characteristics. The vibe data may include time-coded metadata. Based on the vibe data, generating visualization instructions for one or more audio/visual (A/V) devices in communication with the user computing device. The method may include transmitting the generated visualization instructions and the audio track to the user computing device.

In another embodiment, the disclosure describes a system for creating an immersive audio experience. The system may include a plurality of audio/visual (A/V) devices configured to provide A/V effects. The system may include a user computing device configured to wirelessly communicate with the plurality of A/V devices. The user computing device may include one or more processors in communication with a memory containing processor-executable instructions to provide a graphical user interface for receiving a user selection of an audio track. The system may include one or more remote computer servers in electronic communication with the user computing device. The one or more remote computer servers may include one or more processors in communication with a memory containing processor-executable instructions to receive audio track metadata for the audio track from an audio source and analyze the audio track metadata to determine one or more audio track characteristics associated with the audio track. The memory may also contain instructions to generate vibe data based on the one or more audio track characteristics where the vibe data may include time-coded metadata. The memory may also contain instructions to, based on the vibe data, generate visualization instructions for at least one of the plurality of audio/visual (A/V) devices and transmit the generated visualization instructions and the audio track to the user computing device. The memory of the user computing device may further contain processor-executable instructions to transmit the generated visualization instructions to the at least one of the plurality of audio/visual (A/V) devices.

In another embodiment, the disclosure describes a computer-implemented method for creating an immersive audio experience. The method may include receiving, from a user computing device, a user selection of an audio track via a user interface, and analyzing the audio track to determine one or more audio track characteristics. The method may include generating vibe data based on the one or more audio track characteristics, where the vibe data may include timecoded metadata. The method may also include receiving, from the user computing device, one or more user instructions to edit the vibe data to generate user vibe data. The method may include generating visualization instructions based on the user vibe data, and transmitting the generated visualization instructions and the audio track to the user computing device.

BRIEF DESCRIPTION OF THE DRAWINGS

The invention may be better understood by references to the detailed description when considered in connection with the accompanying drawings. The components in the figures are not necessarily to scale, emphasis instead being placed upon illustrating the principles of the invention. In the figures, like reference numerals designate corresponding parts throughout the different views.

FIG. 9 is an embodiment of a light fixture in accordance with the disclosure;

FIG. 10A is another embodiment of the light fixture of FIG. 9 including four light bulbs;

FIG. 10B is another embodiment of the light fixture of FIG. 9 including eight light bulbs; and FIG. 10C is another embodiment of the light fixture of FIG. 9 including sixteen light bulbs.

Figure 1:
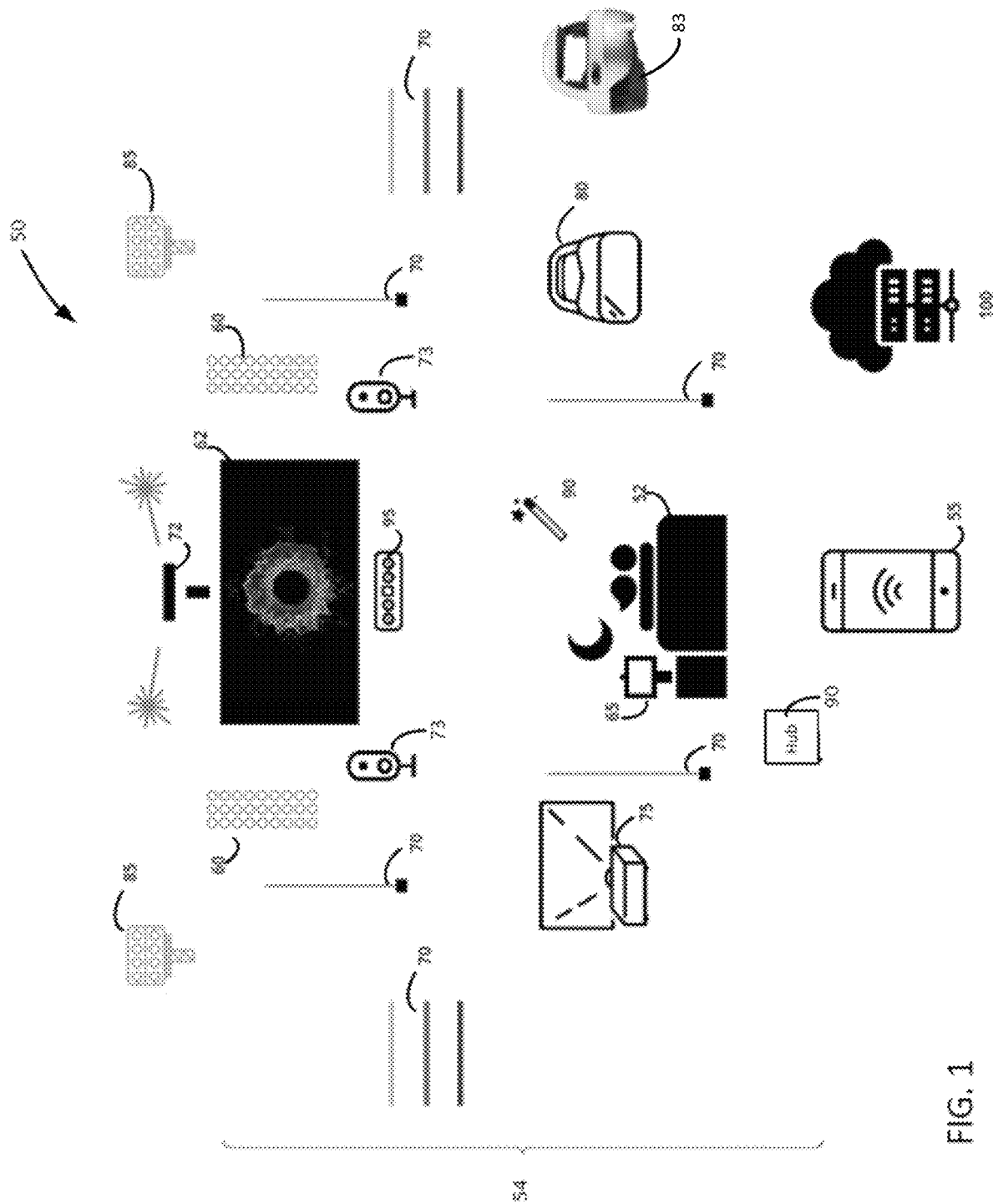
FIG. 1 is diagram of an embodiment of an audio/visual environment configured according to the system and method for an immersive audio experience in accordance with the disclosure.

Persons of ordinary skill in the art will appreciate that elements in the figures are illustrated for simplicity and clarity so not all connections and options have been shown to avoid obscuring the inventive aspects. For example, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meaning have otherwise been set forth herein.

DETAILED DESCRIPTION

The present invention now will be described more fully hereinafter with reference to the accompanying drawings, which form a part hereof, and which show, by way of illustration, specific exemplary embodiments by which the invention may be practiced. These illustrations and exemplary embodiments are presented with the understanding that the present disclosure is an exemplification of the principles of one or more inventions and is not intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

In some embodiments, the disclosure describes a system and methods that may provide users with an immersive way to experience audio, including music, podcasts, workouts, meditation, religious events, etc., audio. The system may include providing immersive experience software, which may be an application or other software operable on a user computing device that may receive musical and other data inputs from one or more sources and output instructions to one or more audio/visual components in a user's home or other suitable location such as a vehicle, office, gym, restaurant, etc. In some embodiments, the experience may simulate attending a live music event, or may provide sensory inputs rooted in the audio that provide a more immersive sensory experience than may be traditionally achievable in the home. In some embodiments, the system may include interactive opportunities for artists and other users to more easily create custom lighting and media designs that may provide for a unique and immersive listening experience.

Traditional systems that attempt to simulate a live musical experience in the home or provide other sensory experiences related to music may use hardware devices that react based on the music's beat as received through sensors/microphones. But those systems have little or no understanding of the song's tempo/BPMs, mood, key, energy, beats, bars, phrases, call and response structures, instruments, vocals present, etc., and therefore do not accurately emulate something like a professional, custom designed musical event that may include synchronized and/or customized lighting design.

To improve upon this, in some embodiments, the system may include a software application that may, for example, receive audio streams from a music streaming service or digital service provider (DSP) (e.g., Amazon Music, Apple Music, Spotify, YouTube, etc.) or other audio source, overlay a digital data stream that may provide visual and other effects based on a particular song's characteristics, and send the resulting data to appropriate hardware devices, such as smart L.E.D. lights, speakers, lasers, projectors, etc. In some embodiments, the data stream may include the stream type (e.g., song, podcast, workout, etc.), beats per minute (BPM), musical key, genre, artist, album, energy, etc. The stream may have a stream timecode that may include a first beat, bars, phrases, scenes, and musical elements. The scenes may include an intro, verses, chorus, buildup, drop, bridge, outro, etc. The musical elements may include, for example, drums, instruments, vocals, lyrics, melodies, etc. In some embodiments, the system may operate with little or no additional input or musical skill required on the part of the user so that an immersive experience may be achieved by virtually anyone. In some embodiments, the disclosed system may include hardware and/or software resources that may create the digital data stream using artificial intelligence (AI), machine learning, and/or other digital processing techniques to generate an improved audio/visual (A/V) environment for accessing music or other media.

The software application may use several data types and their interactions to produce the immersive effects described herein. In some embodiments, the primary data types may be music analysis, vibes, and fixtures. The music analysis data type may include the significant features of a music track in a presentation agnostic manner, including but not limited to both time domain and frequency domain characteristics, spectral analysis, chroma features, harmonic ratios, and Mel-frequency cepstral coefficients. Some presentation-adjacent information may be included, such as describing the most significant stems (e.g. Vocal stem) in a track to help guide how they may be prioritized and assigned to fixtures. The fixtures data type may describe the collection of outputs and their addressable properties or capabilities. They could potentially be almost anything, but some categories include: lights (e.g., Hue, Nanoleaf, LiFX, etc.), devices (e.g., scalp massager, magic wand, gesture glove, etc.,), and visualizers (e.g., TV screen, VR headset, properties exposed by a software visualizer). In some embodiments, physical lights and/or devices may be organized into groupings and assigned to zones within a media environment or space. The "vibe" data type may be inclusive of hardware configuration properties, time-coded instructions/events, and other metadata. Vibes may encapsulate the creative output of a vibe creator (human or AI) and may serve to bind music analysis data to a set of fixtures and properties, along with their visual animation and representation (e.g. color transition, fixture rotation, brightness over time). In some embodiments, a vibe may be fully agnostic of both the musical track (except with custom vibes), and the specific A/V fixtures available to any given user or environment. In some embodiments, vibes may be universal or custom. Universal vibes may be designed to be applied to virtually any musical track, while custom vibes may be specific to a single track. In some embodiments, custom tracks may include time-based triggers, animations, or other settings. The software application (i.e., "client"), which may be a web application, mobile application, etc., may interpret the vibe bindings based on the analysis data, may adjust for user preferences and/or overrides (e.g., different color schemes), and may map the results to the fixtures in substantially real time. A user of the software application may also make custom adjustments, such as color range (e.g., with a color wheel), intensity (e.g., adjusting the "contrast" of the experience, such as using more flashes (high contrast) instead of pulses (low contrast), and/or brightness (e.g., the brightness of the overall experience)).

In some embodiments, methods of using such systems may include separating drums, bass, leads, vocals, melodies, instruments, etc., in the audio stream into separate channels and assigning each channel to a unique hardware device (e.g., drums to lasers and strobe lights, vocals to LED lights, etc.). In some embodiments, the digital data stream that may control the A/V hardware (e.g., smart lighting and/or experience devices, either real or virtual) may be provided by the actual artists who wrote/composed/performed the music or other audio, or may come from sound/light designers who work with the artists. For example, a musical artist may have used a particular set of lighting and other visual effects for a live concert in the past, and the data for that performance may be translated into a data stream to control the system's hardware in a similar way. Alternatively (or in addition), the method may include creating and using data streams developed using machine learning or other artificial intelligence techniques. For example, machine learning may be used to analyze song data alongside historic corresponding visualization data to develop algorithms that may be applied to develop visualization data for controlling hardware on the fly, or saved and categorized for each song or recorded performance.

In some embodiments, the system may be provided to users as a kit together with varying levels of A/V hardware (either real or virtual) to be used along with the software controlling that equipment, or provided as purely software that may be compatible with different types of hardware devices that may exist or may become available. In some embodiments, users may implement the disclosed systems and methods using more or less robust A/V equipment or fixtures, from one or two speakers or lights, to more complex lighting, sound, haptic, and other sensory input equipment. The disclosed system may be flexible so as to scale the outputs based on a user's particular A/V setup and may allow for scaling that A/V setup if/when additional equipment may be provided.

Audio/Visual Environment

FIG. 1 shows an exemplary embodiment of an A/V environment 50 that may implement the system and methods disclosed herein on behalf of a user 52. The A/V environment 50 may include various A/V equipment or fixtures 54, such as strobe lights 60, speakers 73, TV monitors or other screens 62, ambient lighting 65, L.E.D. lights 70, lasers 72, 3-D and video projectors 75, virtual reality goggles 80, head massager 83, spot and moving-head lighting 85, etc. Those of skill in the art will recognize that additional types of A/V equipment may additionally be used within the scope of the disclosure, and that more simplistic and/or complex lighting and sound systems may be used. Additionally, while the A/V environment may be made up substantially of real-world hardware, in some embodiments, the A/V environment may include all or substantially all virtual A/V equipment, such as may exist in a 3D simulated virtual environment. The A/V environment 50 may also include a user computing device 55, that may be a smart phone, tablet, laptop, desktop, or any other suitable computing device capable of running the immersive experience software. In some embodiments, the computing device 55 and/or the A/V equipment 54 may communicate with one or more remote cloud servers 100 either directly or via a home hub, such as home hub 90. In some embodiments, the home hub 90 may be a computing device specially configured to communicate with the A/V equipment 54, the computing device 55, and the remote cloud servers 100. In some embodiments, the home hub 90 may handle communications with the A/V equipment and/or the remote servers 100 on behalf of the computing device 55, or the computing device may communicate directly with the A/V equipment and/or the remote servers 100. The cloud servers 100 may, for example, store and update databases of A/V data that may correspond to particular songs, performances, audio events, etc., as previously created from analysis, machine learning, or other artificial intelligence techniques. For example, the remote cloud server 100 may include a database of lighting and sound design data and files that pertain to historical concert performances and that may be streamed or downloaded to the computing device 55 upon request. In some embodiments, the cloud servers could provide real-time analysis and on-the-fly generation of visual data for the A/V equipment.

In some embodiments, the A/V equipment 54 may communicate individually with the computing device 55 via a wireless connection. In some embodiments, the A/V equipment 54 may communicate with the computing device 55 and/or the home hub 90 via a local area network (LAN), such as a common Wifi network or other wireless connection (e.g., Bluetooth, near field communication (NFC), radio frequency (RF), 4G/5G, 802.11a/b/g, etc.). In some embodiments, some or all of the A/V equipment 54 may include a wireless or wired connection to an A/V receiver 95, which may communicate with the computing device 55 to receive audio, video, and data files transmitted based on instructions from the immersive experience application. In some embodiments, the users computing device 55 may control the sound, video, audio, lighting, provided through the A/V equipment 54. In some embodiments, the A/V environment 50 may also include an auxiliary input/output device 90 that may be used to make physical gestures that may control the sound, video, audio, lighting, provided through the A/V equipment 54. In some embodiments, the auxiliary input/output device 90 may communicate with the computing device through a Bluetooth or other wireless connection, or the computing device may itself act as the auxiliary input/output device. In some embodiments, a user may use the auxiliary input/output device 90 like conductor's wand to control the intensity and type of audio and visual outputs produced by the A/V equipment 54. In some embodiments, the auxiliary input/output device 90 may be a Bluetooth wand with a three-axis gyroscope and infrared signal. The device 90 may be used, for example, to amplify or mute the vocals, drums, or the instrument layer to focus on other particular portions of the music or other audio, such as a singer's voice, a guitar solo, etc. In some embodiments, the user's body movements, dances, and/or hand gestures may be captured by cameras on their own equipment 55, or other hardware devices, to control the sound, video, audio, lighting, provided through the A/V equipment 54.

Data Flow and Processing

As will be apparent from the disclosure, the immersive music system described herein may be used in virtually any A/V environment, or any virtualized environment presented in 3D virtual environments accessed via VR/AR hardware, or other computing hardware, from fairly minimal sound and visual systems to complex lighting and other special effects. Although the end experience may be different in such environments, the system and methods for handling the data flow and generating those experiences may be substantially similar or virtually the same in many aspects.

Figure 2A:
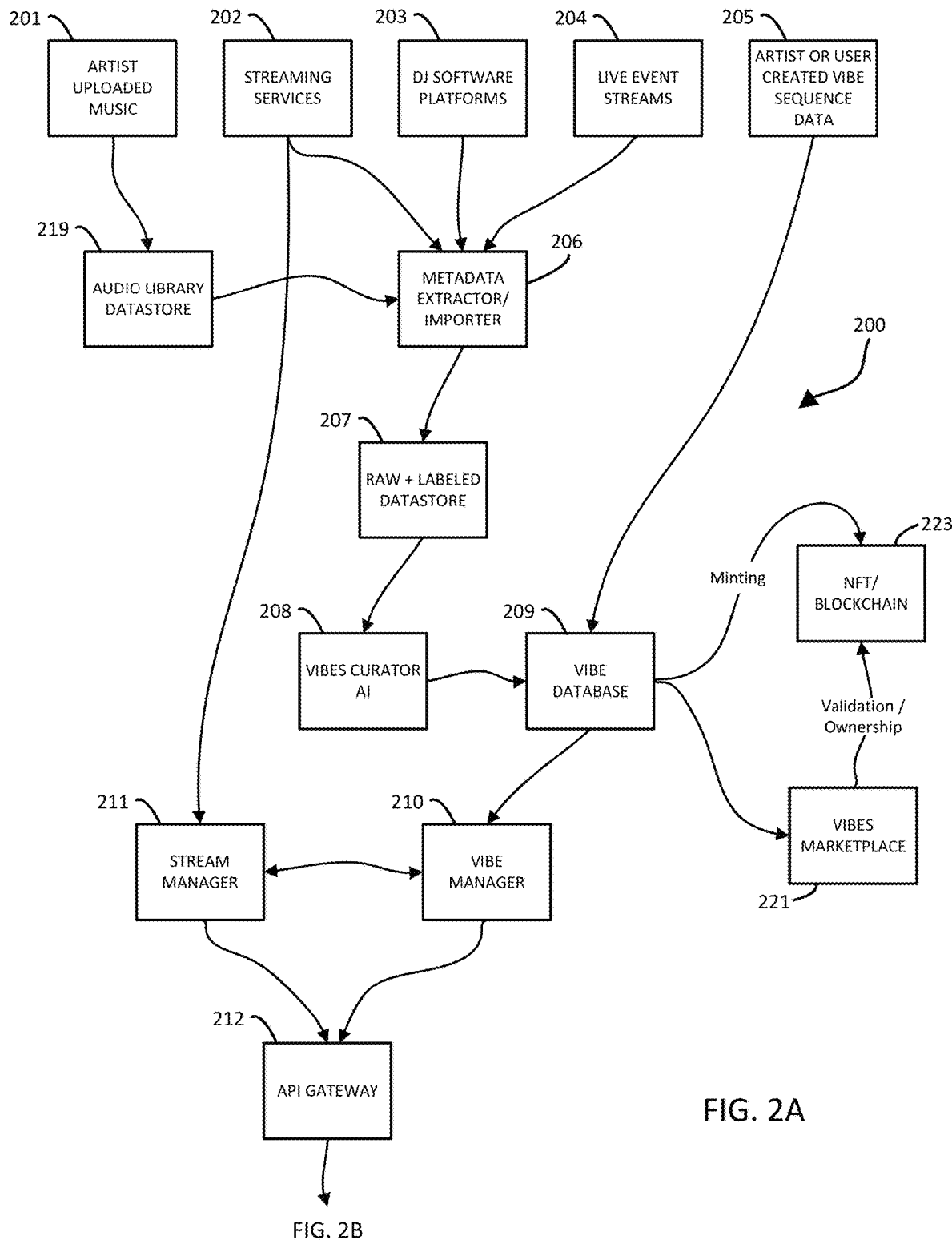
FIG. 2A is a first portion of a data flow diagram of an embodiment of how data may flow through an immersive audio system in accordance with the disclosure.
Figure 2B:
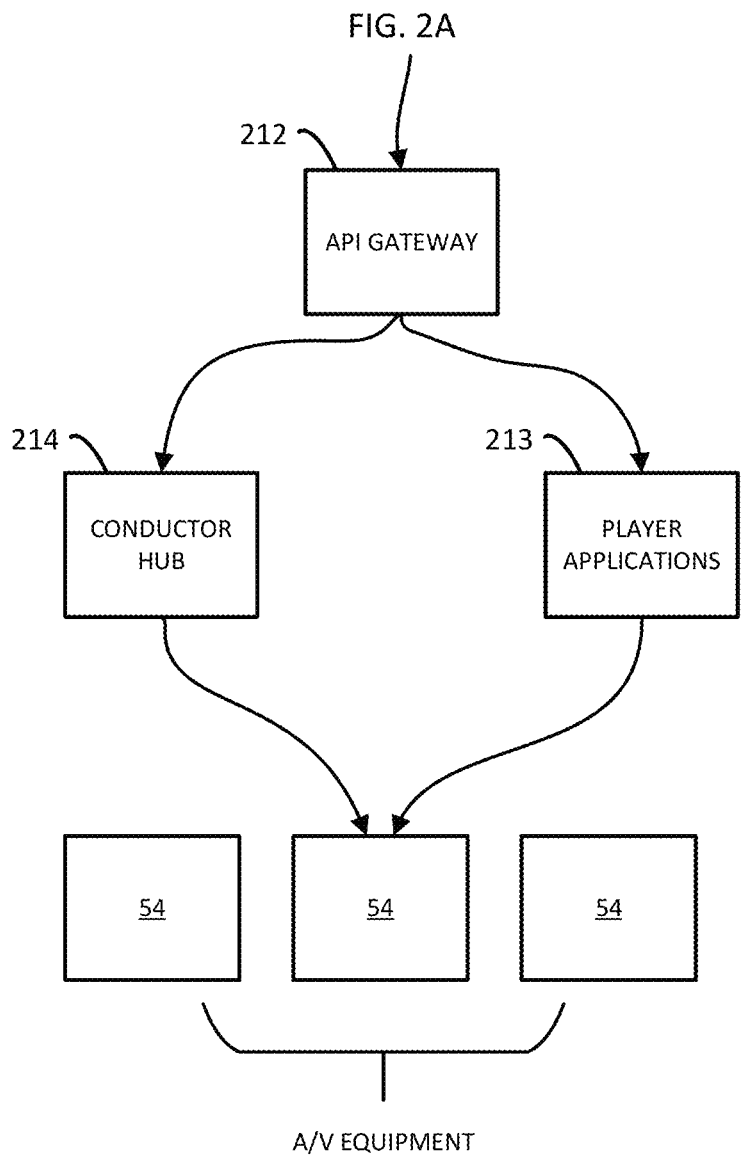
FIG. 2B is a second portion of the data flow diagram of FIG. 2A.

FIGS. 2A and 2B are a data flow diagram illustrating an embodiment of how data may flow through various components in an immersive audio system 200 as disclosed herein. In some embodiments, the data represented in the diagram may be transmitted over any suitable network, such as the internet, cellular networks, local networks, etc. Also, the data flow may occur within one or more computing devices, such as computing device 55 or cloud servers 100, that may be connected via one or more networks. In some embodiments, certain computers or servers making up the computing environment used by the immersive audio system may be specially designed to run the immersive audio system or components thereof.

A vibe, as referenced and used in the immersive audio system 200 disclosed herein, may be inclusive of multiple data types and data sets used by the system to function, including but not limited to an experience data container inclusive of hardware/fixtures configuration properties, time-coded instructions/events, and other metadata used in an immersive audio ecosystem. Referring to FIG. 2A, in some embodiments, metadata and other data used by the system, especially the metadata extractor/importer 206, may be generated by retrieving data from one of a variety of data sources, such as artist-uploaded music 201, streaming services or DSPs 202, DJ software applications 203, live event streams 204, or artist or user created vibe data 205. Of course, those skilled in the art will recognize that other audio/visual/media data sources may also be used consistent with the disclosure. Data from each of these sources may flow into a metadata extractor/importer 206 to be processed.

Artist uploaded music 201 may be stored in an audio library datastore 219 hosted in the immersive audio system 200 ecosystem. In some embodiments, the immersive audio system 200 or an immersive audio application may provide for artists to upload their own music or other media to the audio library datastore 219 so that the immersive audio system may generate vibe data based on their music. In some embodiments, the immersive audio system may include an application programming interface (API) specially configured to provide for artist to upload music or other media to be used by the immersive audio system 200. Music and audio from virtually any audio streaming source or service 202, library, or content delivery system (CDN) may be analyzed to generate vibe data as well. In some embodiments, the audio may be analyzed from one or more online streaming services, musical databases, podcasts, other audio applications, etc., from which a user may choose to play an audio selection. In some embodiments, this may be streaming services 202 such as Spotify, Amazon Music, Apple Music, etc., or may be a user's own stored audio library. In some embodiments, the audio stream data may be authenticated and metadata such as artist, audio type, song, genre, lyrics, album, APIs, etc., maybe extracted from the streaming service or other audio source. In some embodiments, data may be received from a DJ software application platform 203, such as Pioneer Rekordbox. In some embodiments, the data accessed from any source (201-205) may be sequenced lighting design data, Digital Multiplex (DMX) data, or other suitable forms of data. Data from live event streams 204 may be for any of a variety of live event types that include audio, such as music concerts, sports or eSports, workouts, theater, religious ceremonies, etc. In some embodiments, the live event data may reflect aspects of an event's light and sound design such as the desired moods and feelings created by mixing lights, lasers, fog machines, pyrotechnics, video screens, etc.

Audio from the audio library datastore 219 or from streaming services 202 may be provided in a form that may be digested by the immersive audio system, or may be processed using an algorithm, such as a vibes and logic (V+L) algorithm. In some embodiments, the V+L algorithm may be used to analyze the audio for substantially any number of songs and audio sources/streams in order to extract time-coded data. In some embodiments, various channels such as vocal, instrument, and drum channels may be separate and analyzed individually or as a collective. The extracted data may be stored in a vibe database 209, audio library datastore, or any suitable storage medium. For example, the V+L algorithm may extract music and harmonic data such as track key, beats per minute (BPM), genre, beat grid, song phrases and structures (intro, verse, buildup, drop, chorus, bridge, outro) frequency grids, intensity, energy level, etc. The V+L algorithm may include engaging one or more machine learning or AI engines. In some embodiments, and as described in more detail herein, the output of the V+L algorithm may be a data container that may be vibe data.

In some embodiments, stream and light data from DJ application platforms 203 may be converted, transformed, cleaned, normalized, etc. Live event lighting design data 204 may be analyzed by an algorithm, such as the V+L algorithm, to ingest, clean, normalize, and transform the data into a consistent format that may be processed by the metadata extractor/importer 206. In some embodiments, key sequences or loops, such as the blending of certain colors, strobe patterns, lasers, spotlights, etc., may be saved as "scenes" for recall during the event but may also be extracted by the V+L algorithm. In some embodiments, the Digital Multiplex (DMX) protocol may be used to control the A/V devices such as lights, lasers, and fog machines. In some embodiments, other protocols may be used to control the A/V devices. In some embodiments, the V+L algorithm may analyze the DMX or other data and transform it into a consistent and usable form. In some embodiments, the live event data 204 analyzed by the V+L algorithm may be for live events that correspond to the songs analyzed by the by the V+L algorithm such that the live event data may correspond to the appropriate song data.

Vibe sequence data 205 created by users or artists may be provided by a vibe and logic experience builder application. In some embodiments, vibe sequences for particular artists, songs, genres, performances, or other audio events may be created by artists, fans, or other parties. In some embodiments, vibe sequences may be officially provided by artists or other performers involved with an audio event. In some embodiments, the experience builder application may be used to create, store, and/or upload vibe sequences for audio events. In some embodiments, each vibe sequence may provide its own style of lighting or other sensory experience related to the particular audio event, or related to an artist, genre, or other category of audio performance.

An audio metadata extractor/importer 206 may receive data from the audio library datastore 219, the streaming services 202, DJ software or DMX data 203, and live event DMX streaming data 204. In some embodiments, the audio metadata extractor/importer may extract time-coded metadata that may include, among other things, beat grids, tatums, segments, bars, beats, BPMs, musical key, instruments, vocals, lyrics, transcript melodies, drums, energy, song intro, buildup, chorus, drop, etc. In some embodiments, the audio metadata extractor/importer may separate vocals, instruments, and drum channels from the audio event in real time. In some embodiments, the metadata extractor/importer 206 may include one or more AI or machine learning engines, and may process and extract data as described in more detail related to FIG. 7 herein.

In some embodiments, the time-coded data from the song analysis performed by the metadata extractor/importer 206, and any normalized live event design data, may be stored in a raw and labeled datastore 207, as song analyzed audio data for use in machine learning or other artificial intelligence training and experience design. This data may alternatively, or additionally, be stored in the vibe database 209 on one or more servers such as the remote cloud server 100, or be stored in other suitable locations. In some embodiments, the song analyzed audio data may be curated by a vibes curator AI system 208. In some embodiments, the vibes curator AI system 208 may employ machine learning techniques to determine visual patterns, color themes, motion and rhythm patterns, text, emojis, etc., that may be appropriate for certain types of musical or audio moods, music, genres, build-ups, etc. The vibes curator AI system 208 may also incorporate song ID, active devices, metadata, and lyrical data into its analysis. In some embodiments, one goal of the vibes curator AI system 208 may be to learn from historic live events and performances by DJs, sound designers, lighting designers, etc., how certain types of lighting and other effects may be applied to enhance a musical or other audio experience. The vibes curator AI system 208 may then be able to apply those techniques to virtually any song by analyzing the song or other audio and applying the appropriate effects. In some embodiments, the vibes curator AI system 208 may predict and design sensory immersive experiences based on audio stream content and a user's available A/V equipment or fixtures, whether real or virtual. In some embodiments, the vibes curator AI system 208 may create "scenes" and loops that may be comprised of patterns, colors, themes, motion, rhythm, text, emojis, etc. The vibes curator AI system 208 may then initiate particular scenes or loops via one or more of the A/V equipment as determined to be appropriate based on a particular audio event. In some embodiments, the scenes or loops may be stored and transmitted between hardware components via a video file format. In some embodiments, the metadata extractor 206, the raw and labeled datastore 207, and the vibes curator AI system 208 could exist across multiple hardware components and/or server components, such as the cloud server 100, including A/V equipment components themselves.

In some embodiments, a vibe database 209 may receive outputs from the vibes curator AI system 208 and/or from vibe sequence data 205 created by artists or users via the vibe+logic experience builder application. In some embodiments, a "vibe" may be an experience data container that may be inclusive of fixture mapping properties, time-coded instructions/events, and other metadata that may be used by the system to provide an immersive audio experience. In some embodiments, the vibe database 209 may store vibes, and may be stored, for example, on a remote cloud server such as remote cloud server 100 shown in FIG. 1. In some embodiments, the vibe database 209 may store multiple "vibes" per stream identifier (ID) such that audio events, audio recordings/streams, or portions of audio events or streams may have more than one option as a vibe. In some embodiments, vibes, universal vibes, vibes mixes, and other data used to provide an immersive audio experience may be repurposed across streams.

In some embodiments, the immersive audio system 200 may include or host s vibes marketplace 221 where vibes may be bought, sold, exchanged, sampled, etc. In some embodiments, a user or artist who creates a vibe may wish to distribute it, sell it, or otherwise make it available to others. In some embodiments, a vibe creator may decide to mint their vibes as a non-fungible tokens (NFT) 223 that may provide benefits to their holders. The vibes marketplace 221 may provide an exchange for artists to provide benefits to their fans through sale of vibe NFTs, which may imbue the holder with special privileges in either the real or virtual world. Those skilled in the art will understand that other uses of vibe NFTs 223 or the vibes marketplace 221 may be contemplated consistent with the scope of the disclosure.

In some embodiments, the vibe database 209 may interface with a vibe manager 210. In some embodiments, the vibe manager 210 may be hosted on a remote server, such as the remote cloud server 100, or another server location. In some embodiments, the vibe manager 210 may provide authentication services for users accessing the vibe database 209 or other system features, such as via a vibes+logic player application. The vibe manager 210 may also provide device configuration, ID matching, device management, provide access to scenes, stories, video, audio types, etc. The vibe manager 210 may also provide rights/access management and manage purchases and/or subscriptions for downloadable content (DLCs) provided through the vibe database 209. In some embodiments, when a user requests access to content on the vibe database 209, the vibe manager 210 may act as gatekeeper to manage permissions, payments, and authentication.

In some embodiments, a stream manager 211 may manage access between a vibes and logic player application, which may run on a user's computing device, and the one or more online streaming services, music databases, podcasts, other audio/video applications, etc., from which a user may choose to play an audio, video or game selection. In some embodiments, this may be a streaming service 202, such as Spotify, Amazon Music, Apple Music, etc. In some embodiments, the stream manager 211 may authenticate the audio stream data and metadata such as artist, audio type, song, genre, lyrics, album, APIs, etc., may be extracted from the streaming service or other audio source. In some embodiments, the stream manager 211 may also provide authentication services and ID matching for access to the streaming services 202. The stream manager 211 may also share data with the vibe manager 210 to coordinate which vibes in the vibe database 209 may best provide an immersive sensory experience for the selected audio stream. In some embodiments, a vibes and logic API gateway 212 may handle data communications between the user computing device running the vibes and logic application and/or a home hub.

Referring now to FIG. 2B, data from the vibe manager 210 and from the stream manager 211 may be exchanged between a user computing device (e.g., computing device 55) running a vibes and logic player application 213. In some embodiments, the player application 213 may interpret or apply the data received and may dynamically assign a voice, instrument, or drum channel to unique devices, such as the A/V equipment 54. In some embodiments, the player application 213 may separate vocals, instruments, and drum channels in real time so that those channels may be analyzed in view of the data received from the vibe database 209 or otherwise stored. It is contemplated that, in some embodiments, this channel separation may be performed by the vibe manager 210 also, or the vibes curator AI 208, or the metadata extractor 206, or instead of the player application 213. Such channel assignment may enable dynamically assigning each channel to a unique device of the A/V equipment 54—for example, the drums may be assigned to the strobe light and lasers, the vocals assigned to the LED lighting, and the instruments to lasers. Of course, the dynamic assignments may also vary based on audio data, such as genre, mood, etc., which may be dictated by the vibe selected for a particular audio event. Accordingly, the application may synchronize channels, colors, patterns, and motion across the A/V equipment 54, such as LED lights, strobe lights, spot lights, lasers, 2D or 3D projectors, augmented reality (AR) or virtual reality (VR) devices, smart monitors or displays, etc. In doing so, the player application may provide an immersive musical or other audio experience to a user for virtually any song, either in a real-world or virtual environment. In some embodiments, the player application's interface may be managed via virtual or augmented reality using appropriate hardware, or via any other suitable media device providing an interface between the user and the player application 213 platform.

In some embodiments, the system 200 may include a vibes and logic "conductor" hub 214 that may exchange data with the stream manager 211 and vibe manager 210, and may also provide instructions to the A/V equipment 54. In some embodiments, the system may include a conductor hub (e.g., home hub 90 in FIG. 1) that may operate independent of the player application 213 on the user computing device, or some embodiments may not include a conductor hub at all but instead communicate all data between the A/V equipment and the vibe manager 210 through the player application. In some embodiments, a user may access an interface for selecting audio events, vibes, previewing vibes, purchasing DLCs, etc., via the player application 213, but once an audio event may be selected, the conductor hub 214 may actively manage instructing the A/V equipment 54 based on data exchanged with the steam manager 211 and the vibe manager 210. Those of skill in the art may recognize that other separation of tasks may occur between the player application 213 and the conductor hub 214 while still remaining within the scope of the disclosure.

In some embodiments, the vibe manager 210 may recognize the audio event provided through the stream manager 211 as an event with pre-analyzed audio data stored in the vibe database 209. In such embodiments, the vibe manager 210 may apply the normalized audio event data for that audio selection to control the A/V equipment 54 accordingly. In some embodiments, if the vibe manager 210 may not recognize the selected audio event as having stored audio data, the vibe manager 210 may apply the visual patterns, color themes, motion and rhythm patterns, scenes, etc., learned from the machine learning process used by the vibes curator AI system 208. In some embodiments, the vibe manager 210 may receive metadata for the audio selection from the stream manager 211, use it to determine which effects, themes, and/or vibes to initiate, and transmit instructions to the player application 213 and/or conductor hub 214 accordingly. In such embodiments, the vibe manager 210, player application 213, etc., may provide substantially real-time production of an immersive audio experience even for audio events that may not have been previously analyzed or for which no audio event data may exist or be stored on the vibe database 209.

Figure 3:
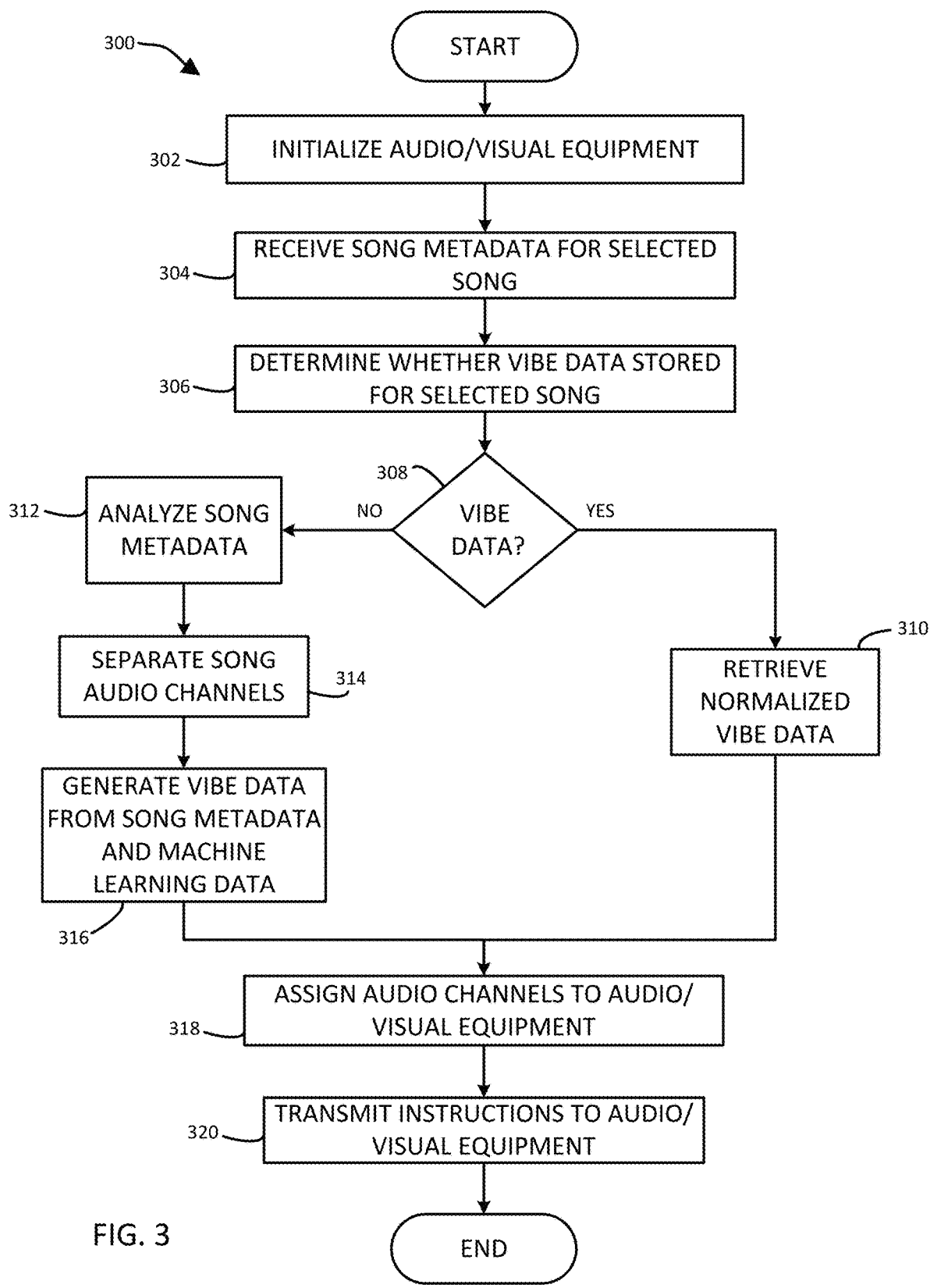
FIG. 3 is a flow chart of an embodiment of a method for implementing the immersive audio system in accordance with the disclosure.

FIG. 3 is a flow chart of an embodiment of a method 300 for using the immersive audio system disclosed herein. At 302, the method may include initializing, by the player application 213, conductor hub 214, or vibe manager 210, one or more pieces of A/V equipment 54 in a user's system. The initialization process may include establishing a connection with each A/V device 54, such as lights, displays, lasers, speakers, etc. In some embodiments, the player application 213 may include a process for detecting, adding, or removing A/V devices 54 from connection with the application and/or with the conductor hub 214. Initialization may also include determining what type of equipment each A/V device 54 may be, what its capabilities are, where it is positioned in the room, and how it is angled/rotated. In some embodiments, the application 213 may include a virtual map of a user's media viewing space via a graphical user interface (GUI) and/or through augmented reality (AR), where the immersive audio system may be located and the user may be able to indicate the locations of each device in the space. At 304, the method may include receiving audio event metadata from an audio source or from the vibe manager 210 via the vibe database 209. In some embodiments, the audio event may have been selected by a user, or may have been selected from a playlist or any other suitable audio selection method. In some embodiments, the application 213 may include a graphical user interface (GUI) by which a user may make song selections. In some embodiments, the interface for audio event selection may be provided through alternative means, such as VR, AR, spoken commands, gestures, etc. In some embodiments, the audio event selection may be made via another application, such as a streaming service, music player, podcast player, etc. In some embodiments, the audio event metadata may be received from a third-party system, such as a streaming service (e.g., Spotify, Amazon Music, etc.). In some embodiments, the system, such as the stream manager 211, may include one or more APIs that may provide for communication between the player application 213, vibe manager 210, and third-party streaming service applications 202. In some embodiments, the player application and/or the vibe manager may also supplement the audio stream with synched and/or time-coded experience metadata that may instruct the A/V devices.

At 306, in some embodiments, the method may include determining whether vibe data may be stored in a vibe database 209 that corresponds to the selected audio stream. For example, in some embodiments, vibe data may previously have been extracted and generated such as in the manner described above with reference to FIG. 2A. In such embodiments, the data may be stored in a vibe database 209 and retrievable by the vibe manager 210 when requested. If, at 308, the vibe manager 210 or player application 213 determines that vibe data may be stored for the audio selection, the player application 213 and/or vibe manager 210 may, at 310, retrieve the vibe data that corresponds to the audio content or segment, such as from vibe database 209 or stored directly on the computing device 55.

If, at 308, the application 213 or vibe manager 210 determines that no vibe data has been stored for the selected audio or video content, then the application or stream manager 211 may, at 312, analyze the audio content metadata to determine, for example, artist, genre, tempo/BPM, lyrics, mood, key, energy, beats, beat grids, bars, phrases, sections, segments, tatums, call and response structures, instruments, and vocals present, and song sections such as intros, builds, drops, chorus, outros, etc, frequencies, spectral analysis, chroma features, harmonic ratios, and Mel-frequency cepstral coefficients, rhythm, intensity, and other song characteristics. In some embodiments, this analysis may be performed by a metadata extractor/importer 206 in communication with the vibe manager 210 and/or stream manager 211. At 314, the method may include separating the selected audio event audio stream into separate channels (stems) for vocal, lead, drums, instruments, bass (either altogether or individually), etc., based on the song metadata. At 316, the system may generate vibe data from the audio event metadata using machine learning data that may be stored on the vibe database. For example, as described above with reference to FIG. 2A, the vibes curator AI system 208 may have compiled data based on historical live events to determine optimal uses of visual patterns, color themes, motion and rhythm patterns, etc. The vibes curator AI system 208 may apply this learned information to the audio event metadata for the selected song and generate visual or sensory experience data for the selected audio event. In some embodiments, it is contemplated that the method may include applying the AI system data to every audio selection instead of referring to stored audio event data.

At 318, the method may include assigning the separated audio channels to individual pieces or to groups of A/V equipment 54, which may include using the generated vibe data from 316 and the normalized vibe data from 310. In some embodiments, analysis of the characteristics and metadata for each individual channel to generate visual or sensory experience data that may be applied based on the behavior of that particular channel. For example, LED lights may be assigned to operate based on vocal data, lasers may be assigned to operate based on instrument data, and spotlights may be assigned to operate based on drum data. Those of skill in the art will understand that other combinations of assignments may also be generated within the scope of the disclosure. In some embodiments, the decision of which channels to assign to each type of A/V equipment may be based on a static algorithm, or may be based on the information learned from the vibes curators AI system 208 during machine learning based on historic audio events. At 320, the method may include transmitting instructions to the A/V equipment 54 based on the visual or sensory experience data so as to create an immersive audio and visual environment that moves, changes, and reacts throughout playback of the selected song or audio stream such as a podcast, sports and eSports, games, movies, etc.

Figure 4:
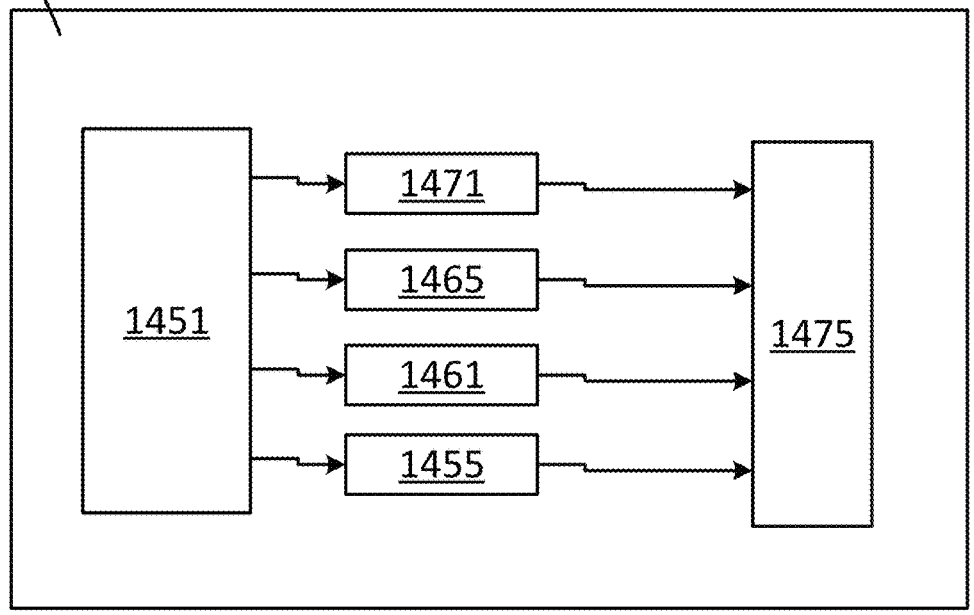
FIG. 4 is a schematic illustration of elements of an embodiment of an example computing device.
Figure 5:
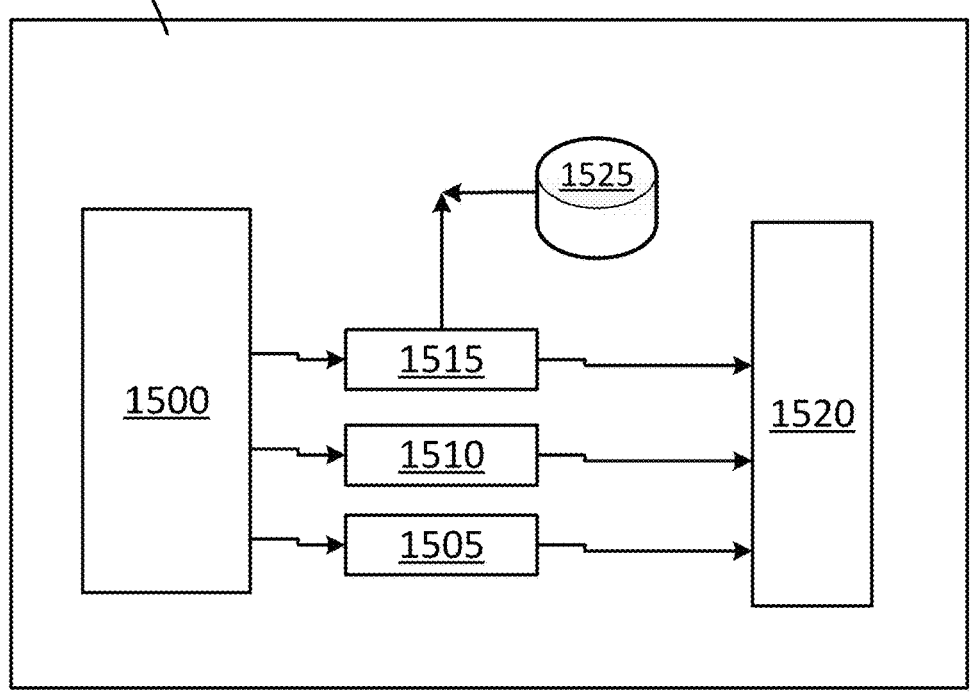
FIG. 5 is a schematic illustration of elements of an embodiment of a server type computing device.

FIG. 4 is a simplified illustration of some physical elements that may make up an embodiment of a computing device, such as the computing device 55, and FIG. 5 is a simplified illustration of the physical elements that make up an embodiment of a server type computing device, such as may be used for the remote cloud server 100. Referring to FIG. 4, a sample computing device is illustrated that is physically configured to be part of the systems and method for an immersive audio experience. The computing device 55 may have a processor 1451 that is physically configured according to computer executable instructions. In some embodiments, the processor may be specially designed or configured to optimize communication between a server relating to the system described herein. The computing device 55 may have a portable power supply 1455 such as a battery, which may be rechargeable. It may also have a sound and video module 1461 which assists in displaying video and sound and may turn off when not in use to conserve power and battery life. The computing device 55 may also have volatile memory 1465 and non-volatile memory 1471. The computing device 55 may have GPS capabilities that may be a separate circuit or may be part of the processor 1451. There also may be an input/output bus 1475 that shuttles data to and from the various user input/output devices such as a microphone, a camera, a display, or other input/output devices. The computing device 55 also may control communicating with networks either through wireless or wired devices. Of course, this is just one embodiment of a computing device 55 and the number and types of computing devices 55 is limited only by the imagination.

The physical elements that make up an embodiment of a server, remote cloud server 100, are further illustrated in FIG. 5. In some embodiments, the server may be specially configured to run the system and methods for an immersive audio experience as disclosed herein. At a high level, the server may include a digital storage such as a magnetic disk, an optical disk, flash storage, non-volatile storage, etc. Structured data may be stored in the digital storage a database. More specifically, the server 100 may have a processor 1500 that is physically configured according to computer executable instructions. In some embodiments, the processor 1500 can be specially designed or configured to optimize communication between a computing device, such as computing device 55, and A/V equipment or remote cloud server 100 as described herein. The server may also have a sound and video module 1505 which assists in displaying video and sound and may turn off when not in use to conserve power and battery life. The server 100 may also have volatile memory 1510 and non-volatile memory 1515.

A database 1525 for digitally storing structured data may be stored in the memory 1510 or 1515 or may be separate. The database 1525 may also be part of a cloud of servers and may be stored in a distributed manner across a plurality of servers. There also may be an input/output bus 1520 that shuttles data to and from the various user input devices such as a microphone, a camera, a display monitor or screen, etc. The input/output bus 1520 also may control communicating with networks either through wireless or wired devices. In some embodiments, an immersive experience controller for running an immersive experience API may be located on the computing device 55. However, in other embodiments, the an immersive experience controller may be located on server 100, or both the computing device 55 and the server 100. Of course, this is just one embodiment of the server 100 and additional types of servers are contemplated herein.

Vibe Creation System

Figure 6:
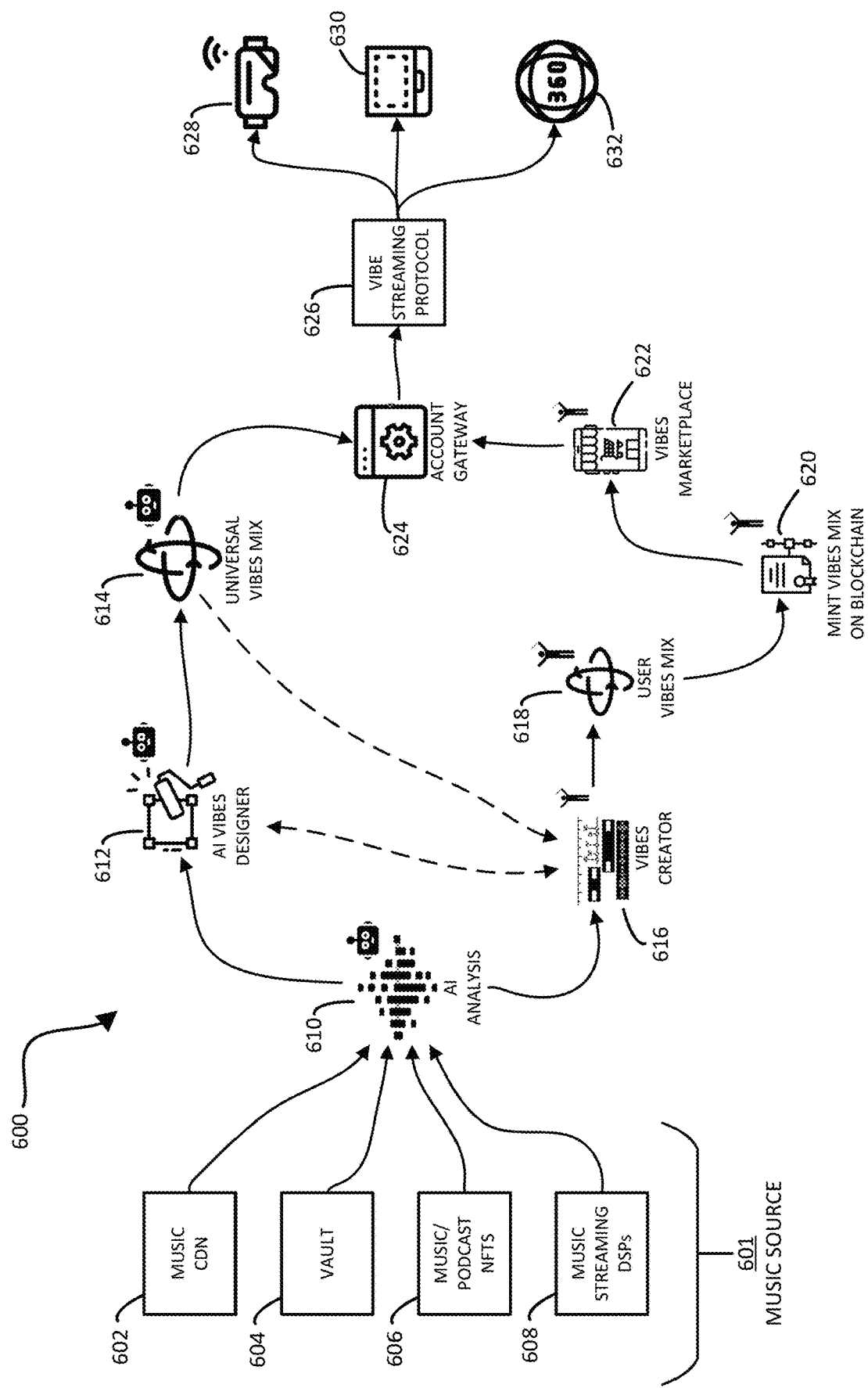
FIG. 6 is a data flow diagram of another embodiment of an immersive audio system in accordance with the disclosure.

FIG. 6 is a diagram of another embodiment of an immersive audio system 600. The system 600 may process audio or other media data to provide a vibe data in a data format that may be implemented in a variety of audio/visual and/or media environments to provide an immersive multimedia experience. The system 600 may retrieve music or other media from one or more music sources 601, which may include music content delivery networks (CDNs), a Vibes+ Logic masters vault 604, music and/or podcast NFTs 606, and music streaming DSPs 608. The music CDNs 602 may include music by unsigned, label-free artist who may upload their music or other media. The masters vault 604 may include track remixes that may have been created specifically for visualization purposes, such as using the visualizations generated through the immersive audio system 600. Music and/or podcast NFTs may be music tracks or other media that may have been minted as an NFT by the artist or another entity. Music streaming DSPs 608 may be any of a variety of music streaming DSPs, such as Amazon Music, Apple Music, Spotify, YouTube, SoundCloud, Tidal, etc.

In some embodiments, music tracks from one or more of the music sources 601 may be selected for processing and generating vibe data, such as by a user accessing a client software application running on user computing device, such as a desktop computer, mobile device, tablet, etc. In some embodiments, the client software application may run via virtual reality (VR) or augmented reality (AR) (VR/AR) devices, such as VR goggles. The selected track may be processed by an AI analysis 610, which may take a fairly flat music track and, through analysis, extract various types of data related to the track. For example, the AI analysis 610 may determine information related to the track, such as beats per minute (BPM), frequencies at various portions of the track, the location and/or timing of different sections of the track (e.g., chorus, verse, build, drop, etc.), key transition moments, stems, etc. In some embodiments, some of this information (e.g., stems) may be provided by the artist, such as by uploading into the masters vault 604. Determining this information may allow the system to better understand the components of a song and make better predictions regarding transitions across different song portions that may benefit from different visualizations.

In some embodiments, the system 600 may provide for generating a visual accompaniment to the music track based on the song information extracted by the AI analysis 610. The visual accompaniment may be generated using an AI vibes designer 612, a universal vibes mix engine 614, a vibes creator 616, or a combination thereof. In some embodiments, the AI vibes designer 612 may interpret the data generated in the AI analysis 610 to determine a track-specific visual accompaniment for the song. The visual accompaniment may include determining appropriate instructions/animations for A/V equipment for different parts of the song based on the song data. For example, based on machine learning and historic data, the AI vibes designer 612 may determine that certain musical aspects of the song may be paired with certain visualizations, such as particular light colors for drum beats, strobe lights for vocals, etc. Those skilled in the art will recognize that these are merely examples of possible visualization mappings, and that the potential variety of outputs of such a mapping process may be virtually unlimited. The result may be that the AI vibes designer 612 may create a visual mapping specific to the song that may result in a generative visual accompaniment. One embodiment of the processes that the AI analysis 610 and AI vibes designer 612 may perform in extracting data and generating a visual accompaniment are described in more detail with respect to FIG. 7.

A non-track specific visual accompaniment may also or alternatively be provided via a universal vibes mix 614. In some embodiments, the universal vibes mix 614 may use the track data from the AI analysis 610 to predict and assign lighting instructions, animations and other visual effects to particular sections of each song regardless of the particular song. In some embodiments, the assigned lighting and other visual effects may be preexisting, having been previously created by users or the one or more AI engines. For example, music tracks may each include similar sections, such as intro, verse, pre-chorus, chorus, bridge, break, build, drop, etc. In some embodiments, the universal vibe mix 614 may assign the same preexisting lighting instructions, animations, or other visual design accompaniment to each song's chorus regardless of which song is chosen, or each build, each, drop, etc. Accordingly, with the universal vibe mix 614, a music track may be accompanied by an immersive visualization and vibe data mapped to the different sections of the song, but the particular visualizations used may not be unique to that song. Accordingly, although the universal vibe mix 614 may not be completely bespoke with respect to a specific song, the visualization information may still be mapped to features of the song as determined by the AI analysis 610 such that it may provide a synced-up visual accompaniment for an immersive user experience. In some embodiments, the universal vibe mix 612 may be used as a first-time vibe editor for sections of a new song for which no users or AI have yet created a bespoke vibe mix. In some embodiments, users may create universal vibe mixes and make them available for purchase, sharing, or distribution to other users, either as NFTs or more widely distributed.

In some embodiments, the system 600 may include a vibes creator 616 that may be accessed through the client software application. The vibes creator 616 may receive track data extracted and/or generated by the AI analysis 610, the vibes designer 612, and/or the universal vibes mix 614. Users (e.g., artists, fans, etc.) may access the vibes creator 616, for example, to create user vibes mixes 618. In some embodiments, the vibes creator 616 will have a user interface to assign and tailor lighting instructions, animations, and other visual accompaniment to different time coded sections of audio or labels of audio sections (e.g. Chorus), as well as the hardware fixture mappings. In some embodiments, the user vibes mixes 618 may result from users further customizing AI-generated vibes mixes from the AI vibes designer 612, or users may create fully custom user vibes mixes with or without the data from the AI analysis 610. In some embodiments, the vibes creator 616 receive information from the universal vibes mix engine 614 that may also allow users to edit universal vibe mixes (either user generated or AI generated), to further customize those mixes to a particular track, or to generate additional universal vibe mixes that may be applied to various tracks. In such embodiments, users may work from scratch or add to AI-generated vibe mixes to create unique vibe mixes for particular tracks that may reflect unique immersive audio experiences. In some embodiments, the AI vibes designer 612 may analyze the user vibe mixes created with the vibes creator 616 to further improve its AI functionality. In other words, users creating custom vibe mixes for particular tracks may be part of an iterative machine learning process whereby the AI vibes designer 612 generates track-specific vibe mixes based on the AI analysis 610, then may update and refine those vibe mixes based on user-created vibe mixes 618 by one or multiple users. In this way, the AI vibes designer 612 may improve its AI-generated vibe mixes.

In some embodiments, the system 600 may include a minting engine 620 that may provide for minting user vibes mixes 618 on one or more blockchains. The resulting minted vibe mix may be a user vibe mix NFT or other digital asset that may be owned by the user in whole or in part. The minted vibe mixes may incorporate digital contracts providing for specific treatment relating to ownership shares, royalties, profit sharing, resale, underlying intellectual property rights (IP), etc. In some embodiments, the system 600 may include a vibes marketplace 622, where users may sell, exchange, or otherwise distribute user vibe mixes 618 and/or user vibe mix NFTs. The vibes marketplace 622 may be accessed, for example, via the client software application, via a web browser, other third-party software application, etc. In some embodiments, the vibes marketplace 622 may provide samples for potential purchasers to "try" the user vibe mixes 618 prior to buying. In some embodiments, the vibes marketplace 622 may be accessible as a virtual storefront or shop via the Internet, metaverse, VR/AR application, or the client software application. In such embodiments, users may virtually "enter" the vibes marketplace 622 and virtually shop for user vibe mixes that may be crafted for particular tracks, by particular artists, genres, moods, etc. Those vibe mixes may then be played or experienced by the user either through real-world A/V fixtures or virtual A/V fixtures such as in a virtual 3D environment.

In some embodiments, the system 600 may also include an account gateway 624. The account gateway 624 may confirm that the user creating, requesting, accessing, or purchasing the vibe mixes or other information via the immersive audio system 600 is authorized to do so with the particular user information provided, such as a particular user account. In some embodiments, users may log into a particular user account using verifiable user credentials, (e.g., login, password, two-factor authentication, etc.). Each user account may have access to different resources, such as previously created or purchased vibe mixes, vibe creation projects, etc. The account gateway 624 may be the gatekeeper that confirms this authorization information and provide the correct user with access to particular resources in the system 600. The account gateway 624 may also handle subscription information, such as monthly and/or yearly subscription to services provided via the system 600, or access to vibe mixes over the system. The account gateway 624 may also provide for processing payment information for purchases or subscription fees processed through the system 600.

Figure 8:
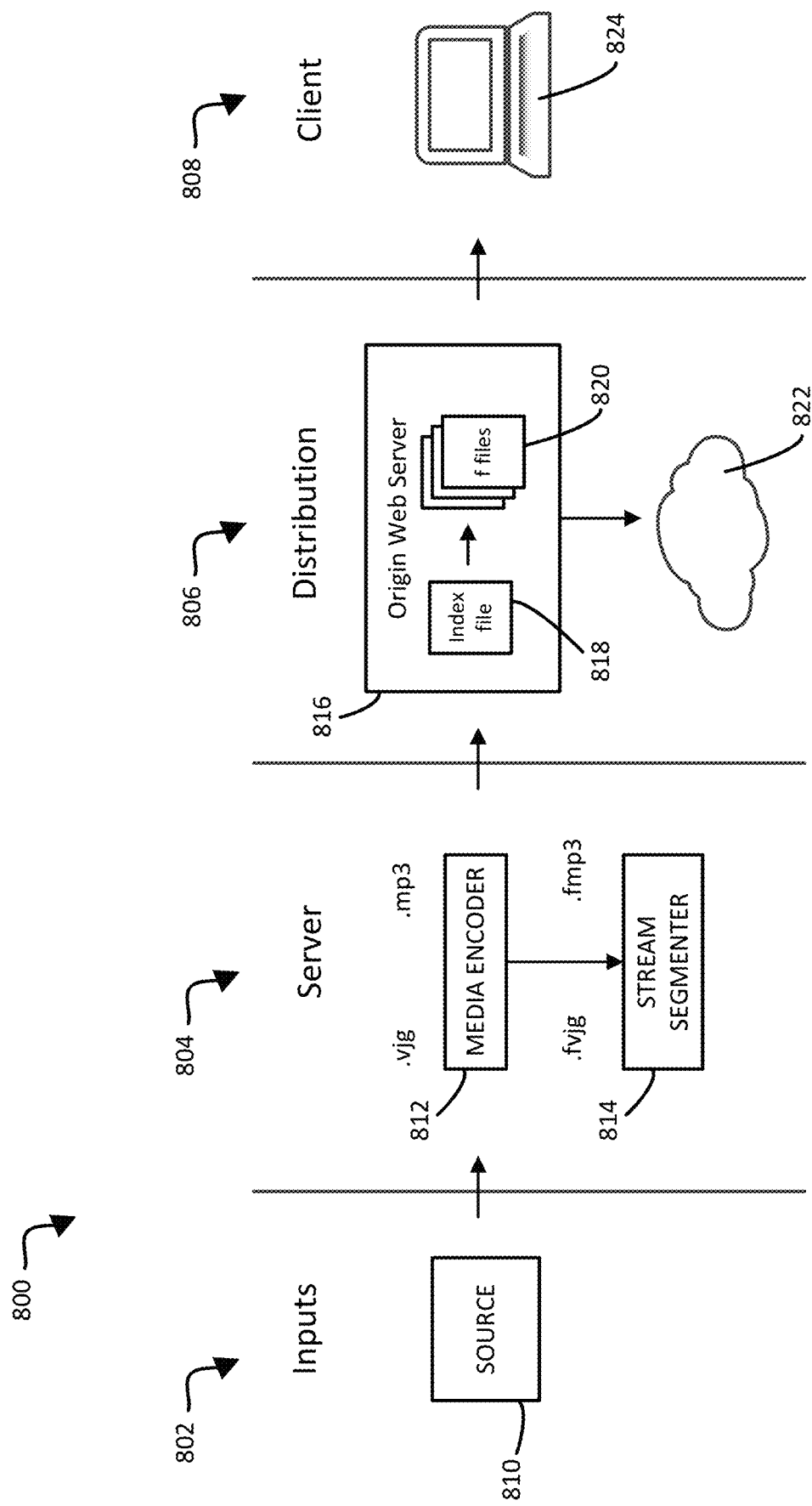
FIG. 8 is a data flow diagram of a vibe streaming protocol as implemented in the immersive audio system of FIG. 6.

In some embodiments, the system 600 may deliver the content of the vibe mix using a vibe streaming protocol 626, an embodiment of which is further detailed in FIG. 8. The vibe streaming protocol 626 may include both audio and visual data bound together in a single stream, providing a streaming protocol that includes a visual accompaniment to audio. In this way, the visual, beat-based information developed by the system 600 through the vibe mix may be combined and delivered to applicable hardware or A/V equipment together. In some embodiments, the vibe streaming protocol 626 may be accessed via a web browser, via a smart home lighting fixture, a VR/AR application, etc. One embodiment of the vibe streaming protocol 626 is described in further detail below with regard to Data Formats.

The vibe streaming protocol 626 may be streamed over the Internet or other network to any of a variety of user A/V equipment, such as VR/AR/XR goggles 628, visualizations or other video monitors 630 (e.g., TVs and monitors), and smart fixtures 632 (e.g., smart lighting, internet of things (IoT)). In some embodiments, the vibe streaming protocol 626 may be accessed and utilized via real life hardware components (e.g., IoT lighting, AR/VR/XR devices, monitors, etc.) or by virtual fixtures in virtual space (e.g., metaverse). For example, in some embodiments, a user may access spaces in the metaverse that have particular virtual media setups, such as virtual sound systems or visualization features that may or may not have real-life analogs. Alternatively, an artist may host a concert or show in a virtual 3D theater that may include virtual visualizations accessible via AR/VR/XR devices or other capabilities. For either virtual or real-life hardware, the vibe streaming protocol 626 may be designed to be accessible by either, or in combination, in order to provide an immersive audio experience for the user and others.

Data Formats

In some embodiments, the system 600 may include several types of data, including analysis data, fixture data, scene data, and vibe data. In some embodiments, analysis data may be track data produced by the AI analysis 610, and may describe the significant features of a music track in a presentation agnostic manner. Some presentation-adjacent information may be included, such as describing the most significant stems in a track to help guide how they will be assigned to fixtures. In some embodiments, the format may be modular and decomposable, meaning an entire track may be sent as a single file, or individual objects (e.g., 'bars') could be streamed alongside the music. In some embodiments, the format may also be deterministic, meaning it may be relatively easy to request or locate the correct data for any arbitrary point within a track (e.g., if the user seeks to a random timecode).

In some embodiments, analysis data may include set objects, track objects, metadata objects, features objects, section objects, and stem objects. Set objects may allow a single audio file/source to expose multiple tracks. Track objects may be a container for sections. Metadata objects may hold set or track data that may not have been generated as a part of the AI analysis 610. Features objects may contain a collection of features that may describe a specific musical selection. This could be a whole track, a section, an individual bar, etc. Section objects may represent a time period within a track. Section objects may be segmented based on significant changes to stems, but may also be used to pass information about smaller "chunks" alongside a streaming event, for example. In some embodiments, section objects may be the primary transport for analysis data. Each section object may convey critical information about the mood and energy of that portion of the track, and may comprise a collection of stems that break the section into its component audio "layers", and suggestions for mapping stems to A/V fixtures. In some embodiments, the client software application may combine this data with information in a vibe and user settings to determine how to map properties and stems to fixtures and fixture parameters. Stem objects may represent an individual instrument or voice in the music.

Fixture data may describe the collection of outputs, such as real or virtual A/V equipment) and their addressable properties or capabilities. The outputs may potentially be almost anything, but some categories may be lights (e.g., LED strips, Hue, Nanoleaf, LiFX, etc.), devices (e.g., scalp massagers, magic wand, gesture glove, etc.), screen (Projector, TV, Tablet, Virtual Wall (in VR/AR/Metaverse), smartphone), and visualizer (e.g., properties exposed by a software visualizer). The physical or virtual lights and devices may be organized by the user into groupings, and assigned to zones, such as grouping together a number of particular smart bulbs and assigning them to "mood." The fixture data format may achieve two main goals: (1) Define each feature, its capabilities, and any user settings that may modify those capabilities; and (2) Assign features to known channels that may be logically bound to analysis data via a vibe.

Scene data may include stage objects, fixture objects, and channel objects, and may include fixture controllers. A stage object may encapsulate all data related to a particular user's full A/V fixture set up, and may be primarily a container for 'fixture' objects. Fixture objects may define the type, capabilities, and settings for a single fixture. Each fixture may be of a known type, with a defined set of expected configuration properties. In some embodiments, a fixture of type 'composite' may allow multiple fixtures to be exposed by a single device. For example, a software visualizer may have multiple lighting fixtures, plus others. A channel object may associate fixtures based on user assignment so they may be controlled as a group with specific behaviors defined in a vibe.

Vibe data may be the output, or the "vibe mix" or "vibe," of the AI vibes designer 612, the universal vibes mix 614, or the vibes creator 616. Vibe data may encapsulate the creative output of a vibe creator (human user or AI) and may serve as the glue that binds the music analysis data (extracted by the AI analysis 610) to a set of fixtures and properties that may occur in any given A/V setup. A vibe, particularly from the universal vibes mix, may be fully agnostic of both the track, and the specific A/V fixtures or equipment that may be available to any particular user. Each vibe may include zone mapping that may later be implemented according to a particular user's A/V setup and zone assignments, but the vibe itself may include information for a predetermined number of zones, such as zones 1-8. Vibe data may include binding objects, and other objects that together define the relationships between musical analysis data and fixtures or similar objects. In some embodiments, this can be comprised of vibe objects, rule objects, timeoffset objects, and binding objects. Those skilled in the art will recognize that these are merely examples of possible bindings, mappings, and relationships between audio and visual mappings, and that the potential variety of objects of such a mapping process may be virtually unlimited.

In some embodiments, at its core, a vibe object may be a container for a collection of "rule" objects, that may define "bindings" between stem features and A/V fixture capabilities, and instructions for when those bindings may be applied. Additionally, a rule object may associate one or more output bindings with one or more time offsets. In other words, a rule object may connect the "what" with the "when". For example, the rule object may include instructions to apply a particular binding (e.g., lighting operation, visualization design, etc.) to a particular section of a certain type of track (e.g., could be genre specific), such as using dimmed, pulsed lighting to the intro to an electronic dance music (EDM) song. The rule object may also specify track specific filters. Tracks may include any variety of song sections, which may be updated or developed over time. For example, some track sections may include intro, verse, pre-chorus, chorus, bridge, outro, break, build, drop, etc. Some sections may be specific to different genres, while others may be used across virtually any genre. Other rule objects could include binding (e.g., lighting operation, visualization design, etc.) to a particular change in prominence or coverage of frequencies, shifts in key, prominence of vocals, or any number of timecoded events identified by AI analysis 610. Those skilled in the art will recognize that these are merely examples of possible rule objects, and the potential variety of rules around such a process may be virtually unlimited.

Timeoffset objects may be a reference relative to a section. It may be specified in time (e.g., milliseconds), bars, or beats. A timeoffset object may comprise any combination of 'start' 'end' and 'length.' In some embodiments, start and end may "pin" the timing range relative to the beginning and end of the section. Length may specify a fixed time extending forward from the start, or backwards from the end. In some embodiments, negative values for start and end may potentially be used to expand the range outside the selected section. Binding objects may connect a single feature of a stem (or smart stem, a dynamic assignment of a stem, for example "front" could be a smart stem indicating which stem is the most prominent or dominant to the perception of the human ear) to one or more capabilities of a fixture zone. In some embodiments, each capability type may have a different set of parameters Vibe Streaming Protocol In some embodiments, the vibe streaming protocol 626 may include both audio and visual data bound together in a single stream, providing a streaming protocol that includes a visual accompaniment to audio. In this way, the visual, beat-based information developed by the system 600 through the vibe mix may be combined and delivered to applicable hardware or A/V fixtures together, whether in real life or virtual. In some embodiments, the vibe streaming protocol 626 may include vibe data encoded directly into the audio stream, which may be in a unique file format. The vibe data included in the stream may be the same or similar data described above with reference to "Data Formats", where the visualization data for a particular section or moment of a song may be included directly into the data stream alongside the audio. The vibe streaming protocol 626 may allow for streaming devices to access the accompanied visual data in sync with each segment of an audio stream. In some embodiments, the unique file format may be a Vibes JSON Grid, or VJG, or "Grid."

FIG. 8 is a diagram 800 an embodiment of using HTTP live streaming (HLS) with the vibe streaming protocol. The diagram includes inputs 802, a server 804, distribution 806, and a client 808. The inputs may be a music source 810, such as is described in greater detail with reference to FIG. 6. The server 804 may be one or more computer servers or cloud servers operating the immersive audio system, such as immersive audio system 600, and/or may be an HLS server. In some embodiments, the server 804 may include a media encoder 812 that may encode the visualization and audio portions of a vibe mix. In some embodiments, this may be the same or similar to the methods described herein as performed by the AI analysis 610 and AI vibe generator 612. The resulting media file may include both audio data and visualization data included as generated in the vibe mix, above. In some embodiments, such files may be VJG file types and may be combined with the MP3 file that includes audio data. A stream segmenter 614 may break the VJG and MP3 files in to FVJG and FMP3 files into segments that may be streamed. In some embodiments, an origin web server 816 may distribute the files using over a network 822. An index file 818 may reference the different segments of the stream, each segment including the appropriate visualization and audio data for that portion of the song. The particular segments may be the f files 820 that may be delivered in segments over the network 822 to a client 824. The client 824 may be a computing device that may run a client software application as described herein that may interpret and assign visualization queues to a user's A/V fixtures. Accordingly, the vibe streaming protocol may include instructions for what visually may occur over the particular segments of the stream, thereby distributing the visual accompaniment along with the audio.

In some embodiments, regardless of how many zones a user may have set up in their particular media environment, the same vibe streaming protocol may be used that may include zone information for zones in excess of the user's capabilities. For example, each vibe streaming protocol file may include information usable in up to eight zones, although other maximum numbers of zones may be used. When the client software application requests a vibe using the vibe streaming protocol, it could only request information for the number of zones for which the user's equipment may accommodate. Because the visual information in the vibe mix may be mapped per zone and client software application separates the A/V fixtures into zones, the vibe streaming protocol may be used regardless of the user's particular media environment.

AI Engine Analysis

Figure 7:
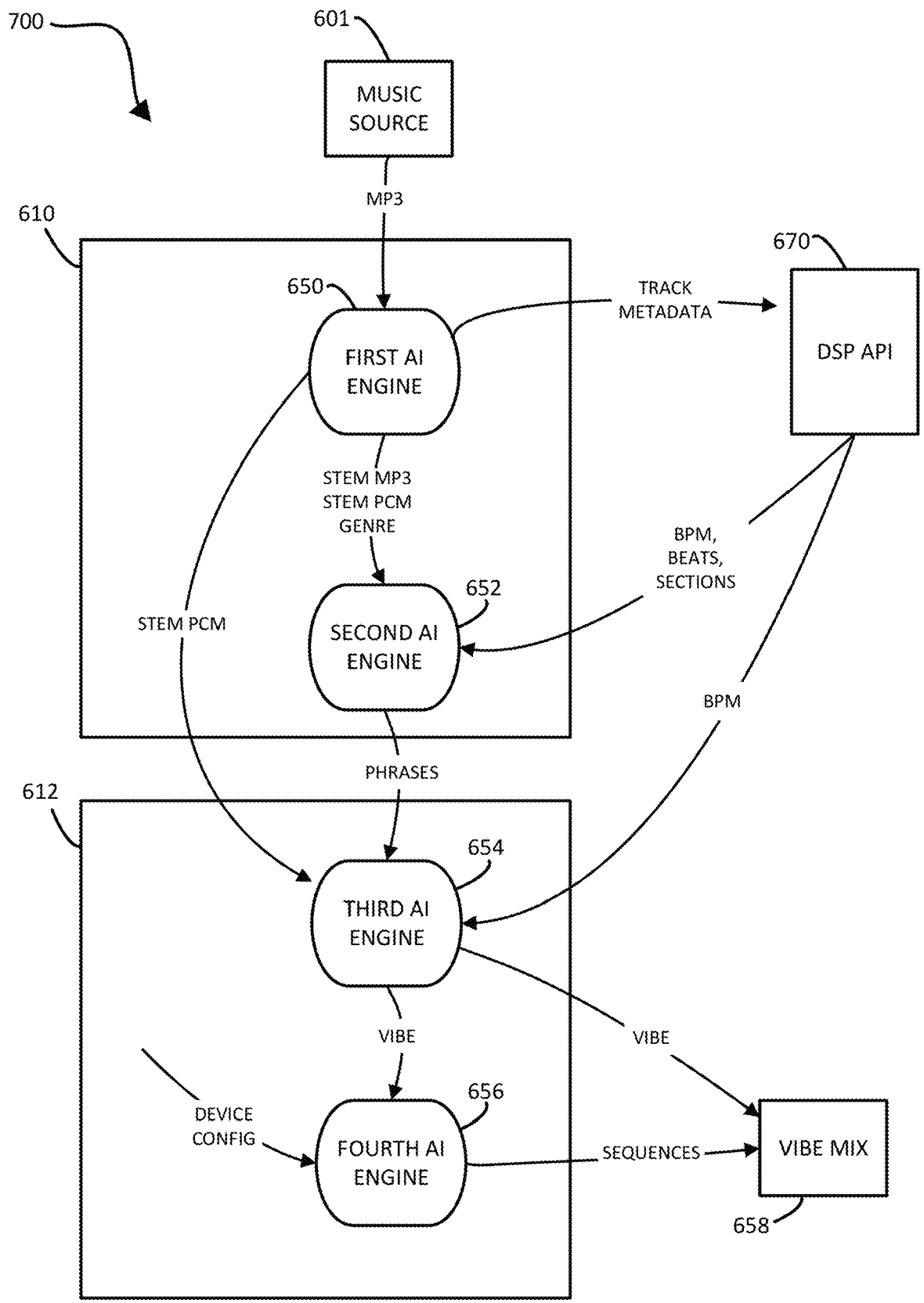
FIG. 7 is a data flow diagram of an embodiment of an artificial intelligence (AI) engine as implemented in the immersive audio system of FIG. 6.

FIG. 7 is a data flow diagram 700 that representing data flow for one or more AI engines to analysis an generate vibe mix data such as represented by the AI analysis 610 and AI vibe designer 612 in the immersive audio system 600. Data from one or more music sources 601 may be received by the AI analysis 610. The AI analysis 610 may include one or more AI engines, such as first AI engine 650 and second AI engine 652. The first and second AI engines 650,652 may perform track analysis in order to transform a relatively flat audio file into a volume of data that may be used to locate portions of a song that may be treated differently for visualization purposes. The music source may provide musical data in one or a variety of formats, such as MP3. The musical track may contain certain metadata, such as artist, title, genre, length, etc. The first AI engine 650 may analyze the track to determine song feature such as beats per minute (BPM), beats, sections, etc. In some embodiments, the first AI engine 650 may transmit track metadata to a DSP API 670, such as Spotify, to return this track information. The first AI engine 650 may also analyze the track to determine stem MP3 and stem PCM information. The stem PCM may include stem data related to particular drums (e.g., snares, kicks, bass), vocals, lead/melody, etc. The second AI engine 652 may receive stem data, BPM, beats, sections, and genre data and generated phrases. In some embodiments, phrases may include the start and/or end of particular sections (e.g., drop: start and end, verse: start and end). Accordingly, the second AI engine 652 may locate and generate data indicating where such phrase events occur throughout a track.

The AI vibes designer 612 may include one or more AI engines that may receive the analysis data from the AI analysis 610 and apply appropriate visualization that may be used to create an immersive audio experience. The embodiment in FIG. 7 includes a third AI engine 654 and a fourth AI engine 656. In some embodiments, the third AI engine 654 may receive the stem PCM data generated by the first AI engine 650, the phrase data generated by the second AI engine 652, and BPM information received by either the DSP API 670 or the first AI engine. The third AI engine 654 may process this data to generate a vibe, vibe mix, or vibe data. The vibe may be an experience data container timecoded instructions and events, and other metadata. For example, a song that may include several 8-bar musical phrases, the generated vibe may enrich the audio file with several 8-bar-long vibes. In some embodiments, the vibe may instead be the length of a phrase. In some embodiments, a single piece of audio may include many compatible vibes. In some embodiments, a vibe generated by the third AI engine 654 may include data fields such as name, mood, musical key, energy/intensity for the phrase, level/loudness, curves (e.g., change of stem over time). In some embodiments, mood may include different tones, such as confused, sad, strong, happy, angry, energized, caring, depressed, afraid, hurt, lonely, regret, chill, that may be represented by different visualization effects. In some embodiments, the first AI engine 650, second AI engine 652, third AI engine 654, and fourth AI engine 656 could work together in an iterative fashion to improve each of their functions described herein. Furthermore, those skilled in the art will recognize that the order of operations would not always follow the same order described, and that different or combined AI engines may analyze and extract similar data while still falling within the scope of this disclosure.

In some embodiments, the fourth AI engine 656 may receive vibe data generated by the third AI engine 654 and device configuration data that may be specific to certain types of equipment. For example, a rotating head fixture may have particular configuration specifications relating to performance and capability that the fourth AI engine 656 may process in order to assign particular activities to that fixture. In some embodiments, the device configuration data received by the fourth AI engine 656 may be for the particular user's A/V fixture environment, or may be for more general categories or types of fixtures. The fourth AI engine 656 may process the vibe data and device configuration data to generate sequences. Each sequence may assign a particular A/V fixture or type of fixture a particular task to be activated at a particular part of a track in order to fulfill the generated vibe experience. For example, a sequence may include information for a rotating head device to activate for a particular length of time, which may be the length of a phrase or of the particular vibe. The sequence may also include particular actions for the device to perform and at what time with reference to the particular sequence. For example, if a 48 second sequence "starts" at 0 seconds and ends at 48 seconds with reference to that sequence. During that 48 seconds, the sequence data may include information relating to the rotation (X, Y, and Z axes), color, aperture, and start time for a particular action. For example, the sequence may include data for the rotating head to rotate to a 180 degree position on the Y axis 24 seconds into the sequence, and rotate back to a 0 degree position on the Y axis at the 48 second mark. Those skilled in the art will appreciate that detailed sequence may be generated for each type of A/V fixture for each phrase and/or vibe during a track.

In some embodiments, the output of the AI data flow diagram 700 may be a vibe mix 658, as shown and described in more detail herein. The vibe mix 658 may include the data that may be bound to an audio track in order to provide a particular immersive audio experience via a user's real or virtual A/V fixtures. For example, in some embodiments, the vibe mix 658 may include information such as name, track (if a musical track-specific vibe), the names of the vibes included within the vibe mix along with where those vibes should start and end (either via beat or time units), the location in the track of particular sequences, etc. In other words, the vibe mix 658 may include the data needed to create the desired immersive audio experience provide by the system 600.

Real and Virtual Lighting Fixtures

As will be appreciated by those skilled in the art, the vibes data generated by the immersive audio system 600 may be implemented by a variety of different real life or virtual A/V fixtures, including lights, smart lighting, visualization environments, lasers, etc. FIG. 9 is an embodiment of a custom smart lighting fixture 900 that may be used in the context of the immersive audio system described herein or in other media environments. The lighting fixture 900 may be substantially circular or ring-like in shape, and may be configured to mount on a wall, ceiling or other surface in a given media environment, and may be powered via battery, A/C power, etc. In some embodiments, the elements of the light fixture 900 may be configured to connect to a wireless network via wifi, Bluetooth, or other wireless or wired connection. In some embodiments, the light fixture 900 may combine mirrors, color bulbs, LED lights, light refractive materials, and may be synced to music either through software such as the client software application described herein or through audio sensing capabilities or other software controls. The light fixture 900 may include a plurality of light bulbs 902, which may be color, low-latency smart bulbs configurable to be synced to music. Although FIG. 9 shows a light fixture embodiment 900 including eight bulbs 902, the number of light bulbs 902 may vary by embodiment and depending on desired visual effect. The light fixture 900 may also include light refractive elements 904, which may include a reflective texture to generate lighting effects. In some embodiments, the refractive elements 904 may be disposed in a ring substantially covering each light bulb, as best seen in FIGS. 10A-10C. From a viewer's perspective, the light bulbs 902 may be behind the refractive elements 904 such that the bulbs' light may shine through the refractive element into the room and create visual effects. In some embodiments, the refractive element 904 may be composed of one or more pieces, may be substantially transparent or translucent, may be clear in color or be tinted one or more colors.

In some embodiments, the light fixture 900 may include one or more LED strips 906. The LED strips 906 may be gradient, multi-zone LED strips including infrared light that may be wrapped on the inside (bulb side) of the refractive element 904 facing out so as to shine light through the refractive elements. In some embodiments, the LED strips 906 may be disposed so as to substantially form an LED ring that may generally trace the a ring pattern established by the light bulbs 902 and the refractive element 904. The LED strips 906 may also be synced to music In some embodiments, the light fixture 900 may also include one or more mirrors 908 that may be mounted to the back of the fixture such that the light bulbs 902 may be disposed between the mirror 908 and the refractive element(s) 904. In some embodiments, the mirror 908 may expand outward past the bounds of the ring of bulbs 902 and refractive elements 904. The mirror 908 may reflect the bulb's 902 and the LED strip's 906 light and amplify their effects.

In some embodiments, the LED strips may be divided into LED zones. For example, FIG. 10A shows an embodiment of a light fixture 900a that includes four light bulbs 902a arranged substantially evenly around a ring-shaped refractive element 904a. The light fixture 900a also includes an LED strip 906a arranged in a ring around the refractive element 904a and divided into four LED zones 906a1, 906a2, 906a3, 906a4. Each of the four zones may be disposed substantially between respective adjacent light bulbs 902a. The LED strip 906a may be programmed or instructed to show different color lighting per each zone in coordination with the adjacent light bulbs 902a or other zones. FIG. 10B illustrates a similar embodiment of a light fixture 900b including eight light bulbs 902b, a mirror 908b, a refractive element 904b, and an LED strip 906b that may be divided into eight zones. Like in FIG. 10A, the LED strip 906b in FIG. 10B may include separate zones defined between adjacent light bulbs, e.g., eight different LED zones. FIG. 10C illustrates a similar embodiment of a light fixture 900c including sixteen light bulbs 902c, a mirror 908c, a refractive element 904c, and an LED strip 906c that may be divided into eight zones. The LED strip 906c in FIG. 10C may include separate zones defined between adjacent light bulbs 902c, e.g., sixteen different LED zones. In some embodiments, it may be desirable for the light fixture 900 to include numbers of lights and/or corresponding LED zones that may be divisible by the number 4 or the number 2. In some embodiments, any desirable number of lights and corresponding LED zones may be used in order to convey a desired visual effect.

In some embodiments, virtual light "fixtures" may be implemented in conjunction with the immersive audio system disclosed herein. In some embodiments, users may create, purchase, or otherwise acquire digital avatars or images that may include layers that may become music responsive. The digital avatars may act as a "digital twin" of the user that may be used throughout the metaverse to attend concerts, shop for vibes, or otherwise socialize with other avatars. In some embodiments, the digital images may be minted as NFTs that may be unique for a particular user or owner of the NFT. During the minting process, the avatar image may be separated into varying PNG layers and assembled into different variations. After mint, all of the layers may be mapped as if they are virtual light fixtures. In other words, the user's digital twin may include different layers that are each music responsive in unique ways. In some embodiments, the layers may process and react to vibe mixes generated using the immersive audio system described herein, or a user may design their own vibes for the digital avatar to respond according to the mapping of their avatar's layers (e.g., as fixtures). In some embodiments, the user's digital avatar or NFT avatar may be seen by others in the metaverse with music responsive layers creating a unique visual display, such as through a visualized output of one or more vibe mixes as disclosed herein.

The figures depict preferred embodiments for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for the systems and methods described herein

The invention claimed is:

1. A computer-implemented method for creating an immersive audio experience, the method comprising:
receiving, from a user computing device, a user selection of an audio track via a user interface;
in response to receiving the user selection, retrieving the audio track from an audio source;
analyzing the audio track to determine one or more audio track characteristics;
generating musical analysis data based on the one or more audio track characteristics;
generating vibe data based on the musical analysis data, wherein the vibe data includes rules for applying one or more audio/visual (A/V) fixture capabilities to one or more sections of the audio track;
based on the vibe data, generating visualization instructions for one or more A/V fixtures in communication with the user computing device;
generating a media file that includes the audio track and the visualization instructions; and
transmitting the media file to the user computing device wherein the musical analysis data includes a plurality of stems for the audio track each corresponding to an instrument type in the audio track, and wherein the rules for applying the one or more A/V fixture capabilities to the one or more sections of the audio track include binding each of the one or more A/V fixture capabilities to one of the plurality of stems.

2. The method of claim 1, wherein the musical analysis data includes a plurality of stems for the audio track, and wherein the rules for applying the one or more A/V fixture capabilities to the one or more sections of the audio track include assigning each of the plurality of stems to a unique A/V fixture of the one or more A/V fixtures.

3. The method of claim 1, wherein the one or more track characteristics include at least one of a genre, beat, beats per minute (BPM), stem significance, frequency, or phrases of the audio track.

4. The method of claim 1, wherein the musical analysis data includes a plurality of stems for the audio track each corresponding to an instrument type in the audio track, and wherein the rules for applying the A/V fixture capabilities to the one or more sections of the audio track include assigning each instrument type to a unique A/V fixture of the one or more A/V fixtures.

5. The method of claim 1 further comprising receiving, via the user interface, a virtual map representing locations of the one or more A/V fixtures in a user's media space, wherein rules for applying the one or more audio/visual (A/V) fixture capabilities to one or more sections of the audio track are additionally based on the locations of the one or more A/V fixtures.

6. The method of claim 1 further comprising:
identifying an A/V fixture type for each of the one or more A/V fixtures in communication with the user computing device; and
determining the one or more A/V fixture capabilities based on each respective A/V fixture type.

7. A system for creating an immersive audio experience, the system comprising:
a user computing device configured to wirelessly communicate with a plurality of A/V devices, the user computing device including one or more processors in communication with a memory containing processor-executable instructions to provide a graphical user interface for receiving a user selection of an audio track; and
one or more remote computer servers in electronic communication with the user computing device, the one or more remote computer servers including one or more processors in communication with a memory containing processor-executable instructions to:
in response to receiving the user selection of the audio track, retrieve the audio track from an audio source,
analyze the audio track to determine one or more time-coded sections of the audio track,
identify a plurality of stems for the audio track each corresponding to an element in the audio track, wherein a first stem of the plurality of stems corresponds to a first element and a second stem of the plurality of stems corresponds to a second element;
assign the first stem to a first A/V devices of the plurality of A/V devices based on the first element,
assign the second stem to a second A/V device of the plurality of A/V devices based on the second element,
for each time-coded section of the audio track, generate first visualization instructions for the first A/V device based on audio characteristics of the first stem and second visualization instructions for the second A/V device based on audio characteristics of the second stem,
generate a media file including the first visualization instructions, the second visualization instructions, and the audio track, and
transmit the media file to the user computing device,
wherein the memory of the user computing device further contains processor-executable instructions to transmit the first visualization instructions to the first A/V device and the second visualization instructions to the second A/V device so as to dynamically adjust the first and second A/V devices during each of the one or more time-coded sections of the audio track.

8. The system of claim 7, wherein the one or more the memory further contains processor-executable instructions to determine a genre for the audio track, wherein generating the first and second visualization instructions is additionally based on the genre.

9. The system of claim 7, wherein the audio characteristics of the first and second stems include at least one of a genre, beat, beats per minute (BPM), frequency, or phrases.

10. The system of claim 7, wherein analyzing the audio track includes using one or more artificial intelligence (AI) engines or machine learning techniques.

11. The system of claim 7, wherein the element is at least one of vocals, drums, musical instruments, or other musical elements.

12. The system of claim 7, wherein the media file and the audio track are transmitted to the user computing device using a streaming protocol.

13. The system of claim 12, wherein the streaming protocol includes binding portions of the media file to associated portions of the audio track.

14. A computer-implemented method for creating an immersive audio experience, the method comprising:
- receiving, from a user computing device, a user selection of an audio track via a user interface;
- analyzing the audio track to determine one or more time-coded sections of the audio track;
- identifying one or more stems for the audio track, wherein each of the one or more stems corresponds to one or more instrument types in the audio track;
- based on the one or more instrument types of each respective stem, assigning one or more audio/visual (A/V) fixture types to each of the one or more stems;
- analyzing each of the one or more stems to determine one or more audio characteristics of each of the one or more stems;
- based on the one or more audio characteristics, assigning, for each time-coded section of the audio track, A/V fixture capabilities associated with each of the respective one or more A/V fixture types to each of the one or more stems;
- generating vibe data that includes bindings between each of the assigned A/V fixture capabilities and the respective one or more stems;
- generating a media file that includes the audio track and the vibe data; and
- transmitting the media file to the user computing device, wherein the user computing device is configured to transmit visualization instructions to one or more A/V fixtures in communication with the user computing device based on the vibe data so as to dynamically adjust the one or more A/V fixtures during each of the one or more time-coded sections of the audio track.

15. The method of claim 14, further comprising determining a genre for the audio track, wherein the assignment of the A/V fixture capabilities is additionally based on the genre.

16. The method of claim 14, wherein the one or more audio characteristics include at least one of a genre, beat, beats per minute (BPM), frequency, or phrases.

17. The method of claim 14, wherein the one or more instrument types is at least one of vocals, drums, musical instruments, or other musical elements.

18. The method of claim 14 further comprising:
- identifying one or more user A/V fixtures in communication with the user computing device; and
- assigning each of the one or more user A/V fixtures to each of the one or more stems.

19. The method of claim 14, wherein the media file is transmitted to the user computing device using a streaming protocol, and wherein the streaming protocol includes binding the vibe data to the one or more sections of the audio track.

* * * * *